(12) United States Patent
Gotoh et al.

(10) Patent No.: US 6,216,676 B1
(45) Date of Patent: Apr. 17, 2001

(54) INTERNAL COMBUSTION ENGINE SYSTEM

(75) Inventors: Masato Gotoh, Susono; Shizuo Sasaki; Kouji Yoshizaki, both of Numazu; Takekazu Ito, Suntou-gun; Hiroki Murata, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/394,919

(22) Filed: Sep. 13, 1999

(30) Foreign Application Priority Data

Oct. 7, 1998 (JP) .................................................. 10-285585
Oct. 9, 1998 (JP) .................................................. 10-288321

(51) Int. Cl.$^7$ .................................................. F02M 25/07
(52) U.S. Cl. ........................................ 123/568.21; 60/274
(58) Field of Search ........................ 123/568.21, 568.24, 123/568.23, 568.26; 60/274, 278, 276; 701/108

(56) References Cited

U.S. PATENT DOCUMENTS 5,890,360 * 4/1999 Sasaki et al. ........................... 60/278
5,937,639 * 8/1999 Sasaki et al. ........................... 60/278
6,055,968 * 5/2000 Sasaki et al. ..................... 123/568.21

* cited by examiner

Primary Examiner—Willis R. Wolfe
Assistant Examiner—Arnold Castro
(74) Attorney, Agent, or Firm—Oliff & Berridge, PLC

(57) ABSTRACT

An internal combustion engine system is capable of reducing soot and NOx simultaneously, and prevents the occurrence of an undesirable situation where a generation amount of soot is increased in accordance with frequent transitions between a first combustion mode and a second combustion mode. In the system, the first combustion mode in which an amount of inert gas supplied to the combustion chamber is larger than an amount of the inert gas that causes the generation amount of soot to become a peak, such that soot is hardly generated, and a second combustion mode in which an amount of the inert gas supplied to the combustion chamber is smaller than the amount of the inert gas that causes the generation amount of soot to become a peak, are selectively performed. When conditions are such that switching between the first combustion mode and the second combustion mode has or may occur frequently, the execution of the first combustion mode is controlled. The frequency of switching can be determined, for example, based on a frequency of change of the engine load, an operational state of the engine, or road information.

31 Claims, 30 Drawing Sheets

FIG. 4
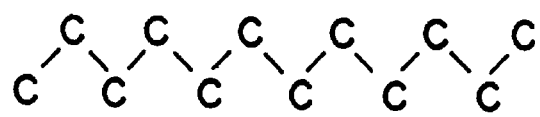
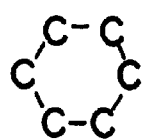 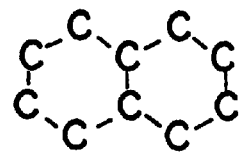
FIG. 5
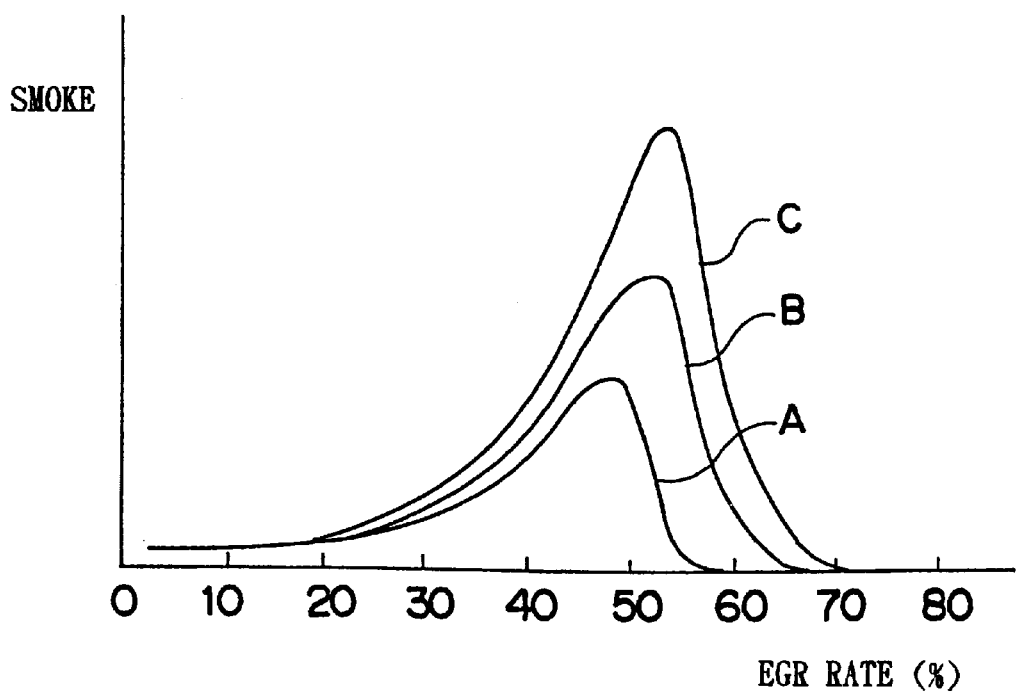

INTERNAL COMBUSTION ENGINE SYSTEM

INCORPORATION BY REFERENCE

The disclosures of Japanese Patent Application Nos. HEI 10-285585 filed on Oct. 7, 1998 and HEI 10-288321 filed on Oct. 9, 1998 including the specifications, drawings and abstracts are incorporated herein by reference in their entirety.

BACKGROUND OF THE INVENTION

1. Field of Invention

The present invention relates to an internal combustion engine system having a combustion chamber into which inert gas is introduced so as to cause combustion.

2. Description of Related Art

Conventionally, in an internal combustion engine, for example, in a diesel engine, in order to restrict the generation of NOx, an engine exhaust passage and an engine intake passage are connected by an exhaust gas recirculation (hereinafter, referred to as EGR) passage so as to recirculate exhaust gas, that is, EGR gas into the engine intake passage via the EGR passage. In this case, the EGR gas has a relatively high specific heat and is able to absorb a large amount of heat. Hence, as the amount of EGR gas is increased, that is, as the EGR rate (the amount of EGR gas/(the amount of EGR gas+the amount of intake air)) is increased, the combustion temperature in a combustion chamber decreases. If the combustion temperature decreases, the generation amount of NOx is reduced. Thus, the larger the EGR rate becomes, the smaller the generation amount of NOx becomes.

As described hitherto, it has been conventionally known that the generation amount of NOx is reduced by increasing the EGR rate. However, in the process of increasing the EGR rate, when the EGR rate exceeds a certain threshold value, the generation amount of soot, namely smoke, starts increasing abruptly. In this respect, it has been conventionally considered that if the EGR rate is increased beyond this certain threshold value, the amount of smoke increases endlessly. In other words, the EGR rate at which the amount of smoke starts increasing abruptly has been considered to be a maximum allowable value of the EGR rate.

Accordingly, the EGR rate conventionally has been set below the maximum allowable value. Although the maximum allowable value of the EGR rate differs greatly depending on a type of the engine or fuel, it is approximately 30% to 50%. Therefore, in the diesel engine, the EGR rate is at most set to 30% to 50%.

As described above, it has been conventionally considered that the EGR rate has a maximum allowable value. Thus, the EGR rate is set so as to reduce a generation amount of NOx and smoke to the maximum possible extent, by ensuring that the EGR rate does not exceed the maximum allowable value. However, even if the EGR rate has been thus determined, the generation amount of NOx and smoke cannot be reduced limitlessly. In fact, the generation of a considerable amount of NOx and smoke is inevitable.

SUMMARY OF THE INVENTION

In the course of studies of combustion in diesel engines, the following fact has been discovered. That is, as described above, if the EGR rate is made larger than the maximum allowable value, the generation amount of smoke increases abruptly. However, the generation amount of smoke has a peak. If the EGR rate is further increased after the generation amount of smoke has reached its peak, the generation amount of smoke then starts decreasing abruptly. If the EGR rate is set to 70% or more during an idling operation, or if the EGR rate is set to about 55% or more in the case where EGR gas is cooled intensively, NOx is hardly generated and the generation amount of smoke becomes almost zero. Namely, soot is hardly generated.

Thereafter, based on this discovery, further studies have been conducted on the reason why soot is hardly generated. As a result, a novel unprecedented combustion system capable of reducing soot and NOx simultaneously has been constructed. This novel combustion system will be explained later in detail. In summary, this combustion system is based on the idea that the growth of hydrocarbon is stopped before it develops into soot.

In other words, it has been determined by repeated experiments and studies that if the temperature of fuel and ambient gas in the combustion chamber during combustion is equal to or lower than a certain temperature, the growth of hydrocarbon is stopped before it becomes soot, and that if the temperature of fuel and ambient gas becomes higher than the aforementioned certain temperature, the hydrocarbon rapidly develops into soot. In this case, the temperature of fuel and ambient gas is greatly affected by the endothermic effect of the gas surrounding fuel at the time of fuel combustion. If the endothermic value of the gas surrounding the fuel is adjusted in accordance with an exothermic value during the fuel combustion, the temperature of fuel and ambient gas can be controlled.

Accordingly, if the temperature of fuel and ambient gas in the combustion chamber during combustion is set equal to or lower than a temperature at which the growth of hydrocarbon is stopped halfway, soot is no longer generated. The temperature of fuel and ambient gas in the combustion chamber during combustion can be set equal to or lower than a temperature at which the growth of hydrocarbon is stopped halfway, by adjusting an endothermic value of the gas surrounding the fuel. On the other hand, the hydrocarbon that has stopped growing before becoming soot can be removed easily by means of an after-treatment that uses an oxidation catalyst or the like. This is the basic concept of the novel combustion system.

An engine can be controlled such that it switches between a first combustion mode, which corresponds to the new combustion mode, and a second combustion mode, which corresponds to a conventional combustion mode, based on engine performance requirements. However, each time the combustion mode is switched, a large amount of smoke is briefly generated. Accordingly, it is desirable to avoid switching between the first and second combustion modes too often.

One object of the present invention is to provide an internal combustion engine system which achieves suitable combustion, that is, prevents generation of soot (smoke) and NOx, simultaneously, and reduces an undesirable situation where a generation amount of soot is increased in accordance with the transition between a first combustion mode and a second combustion mode. The first combustion mode is a mode in which the amount of inert gas supplied to the combustion chamber is more than the amount that causes the peak amount of soot to be generated. The second combustion mode is the conventional combustion mode.

In order to achieve the above and other objects, in accordance with one aspect of the present invention, there is provided an internal combustion engine system in which a generation amount of soot increases to a peak when increasing an amount of an inert gas supplied to a combustion chamber, the system including a controller that controls the combustion mode in which the engine is to operate. The controller switches between a first combustion mode where an amount of the inert gas supplied to the combustion chamber is larger than an amount of the inert gas that causes the generation amount of soot to become a peak amount (and thus soot is hardly generated), and a second combustion mode where an amount of the inert gas supplied to the combustion chamber is smaller than the amount of the inert gas that causes the generation amount of soot to become the peak amount. The controller also can determine the frequency of switching between the first combustion mode and the second combustion mode. Furthermore, the controller controls the execution of the first combustion mode and the second combustion mode so that the frequency of switching between the first combustion mode and the second combustion mode is inhibited from becoming too high (i.e., more than a predetermined amount), for example, when it is determined that the frequency is high.

Accordingly, it is possible to reduce soot and NOx discharged from the combustion chamber simultaneously, and an undesirable situation where the generation amount of soot is increased in accordance with the transition between the first combustion mode and the second combustion mode is avoided.

BRIEF DESCRIPTION OF THE DRAWINGS

The foregoing and further objects, features and advantages of the present invention will become apparent from the following description of preferred embodiments with reference to the accompanying drawings, wherein:

FIG. 4 shows molecules of fuel;

FIG. 5 shows a relationship between the generation amount of smoke and EGR rate;

FIG. 9 shows the opening degree of a throttle valve and the like;

FIGS. 11A and 11B show a map of a target opening degree of the throttle valve or the like;

FIGS. 13A and 13B show maps of a target opening degree of the throttle valve or the like;

DETAILED DESCRIPTION OF PREFERRED EMBODIMENTS

Figure 1:
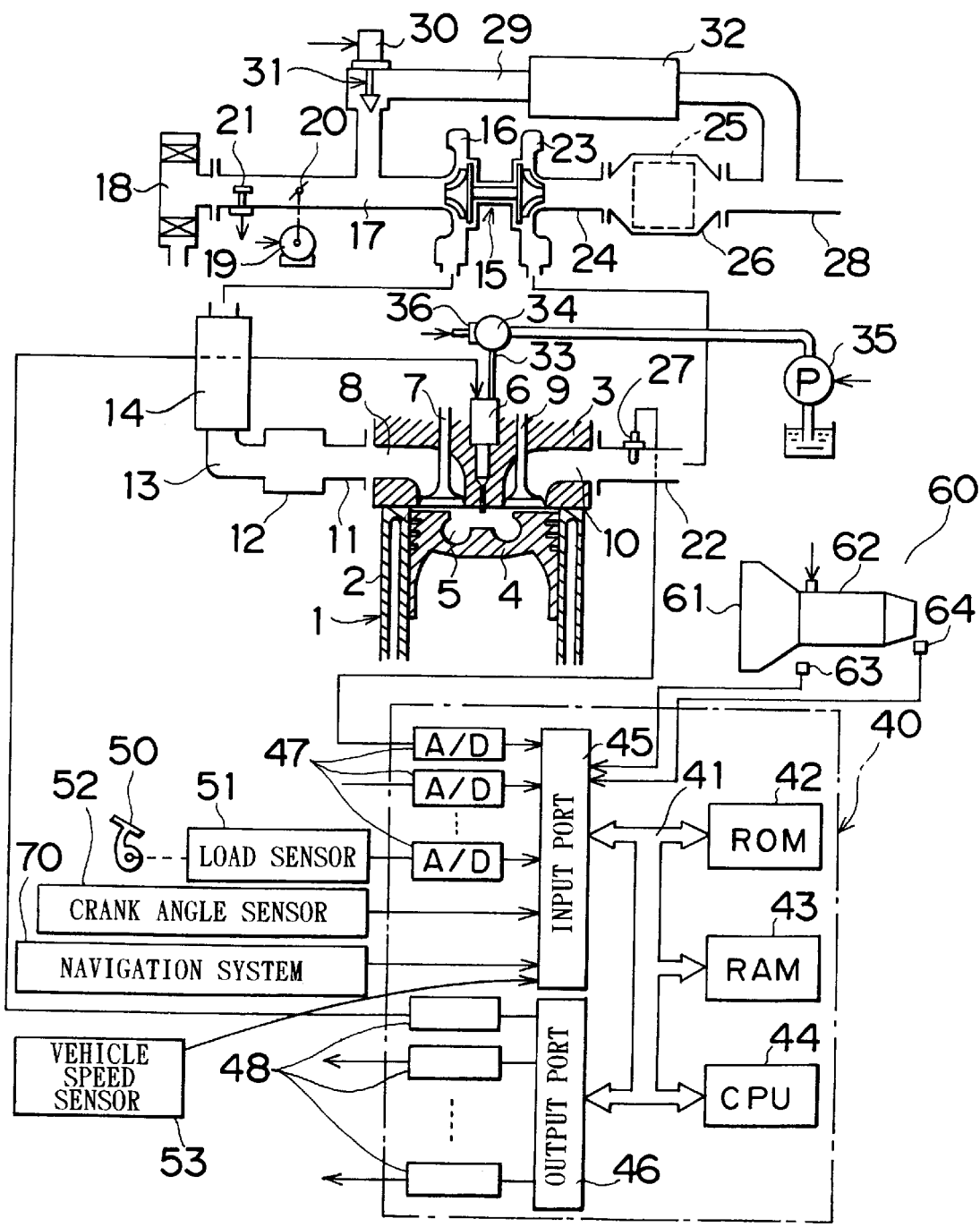
FIG. 1 is a general view of a compression ignition type internal combustion engine.

FIG. 1 shows a first embodiment of the present invention, which is applied to a four-stroke compression ignition type internal combustion engine.

An engine body 1 is composed of a cylinder block 2, a cylinder head 3, a piston 4, a combustion chamber 5, an electronically controlled fuel injection valve 6, an intake valve 7, an intake port 8, an exhaust valve 9 and an exhaust port 10. The intake port 8 communicates with a surge tank 12 via a corresponding intake branch pipe 11, and the surge tank 12 communicates with an outlet portion of a compressor 16 of an supercharger such as an exhaust turbocharger 15 via an intake duct 13 and an inter-cooler 14. An inlet portion of the compressor 16 is connected to an air cleaner 18 via an air intake tube 17. A throttle valve 20 driven by a stepping motor 19 is disposed in the intake tube 17. A mass flow meter 21 that detects a mass flow of intake air is disposed in a upstream portion of the air intake rube 17.

An output shaft (not shown) of the engine 1 is connected to an automatic transmission 60 having a torque converter 61 and an transmission 62. An output shaft of the automatic transmission 60 is connected to the driving wheels of the vehicle via a differential gear (not shown).

The transmission 62 is provided with planetary gears and friction elements, for example a brake and a clutch, and controls a linkage state of the friction elements by changing a control oil pressure. Consequently, the transmission operation is executed by fixing or connecting each gear of the planetary gears. The torque converter 61 is provided with a pump directly connected to the output shaft of the engine, and a turbine driven by a discharged fluid of the pump. An output shaft of the turbine (hereinafter referred to as the output shaft of the converter) is directly connected to an input shaft of the transmission 62. The torque converter 61 amplifies a torque input from the output shaft of the engine, and then transmits the amplified torque to the output shaft of the converter. Further, a speed sensor 63 which outputs a pulse signal having a frequency corresponding to a speed of the output shaft of the converter, that is, the speed of the input shaft of the transmission 62, and a revolution sensor 64 which outputs a pulse signal having a frequency corresponding to a speed of the output shaft of the automatic transmission 62 are adapted to the automatic transmission 60.

The exhaust port 10 is connected to an inlet portion of an exhaust turbine 23 of the exhaust turbocharger 15 via an exhaust manifold 22. An outlet portion of the exhaust turbine 23 is connected to a catalytic converter 26 via an exhaust pipe 24. The catalytic converter 26 incorporates a catalyst 25, which performs an oxidation function. An air-fuel ratio sensor 27 is disposed in the exhaust manifold 22.

An exhaust pipe 28 communicating an outlet portion of the catalytic converter 26 and the air intake tube 17 downstream of the throttle valve 20 are connected with each other via the EGR passage 29. Disposed in the EGR passage 29 is an EGR control valve 31, which is driven by a stepping motor 30. Further, an inter-cooler 32 for cooling EGR gas flowing through the EGR passage 29 is disposed in the EGR passage 29. In the embodiment shown in FIG. 1, engine coolant is introduced into the inter-cooler 32. The engine coolant cools the EGR gas.

Each fuel injection valve 6 is connected to a fuel reservoir, namely, what is called a common rail 34, via a fuel supply tube 33. Fuel is supplied to the common rail 34 from an electrically controlled variable discharge fuel pump 35. The fuel that has been supplied to the common rail 34 is supplied to the fuel injection valve 6 via each fuel supply tube 33. A fuel pressure sensor 36 for detecting a fuel pressure in the common rail 34 is attached thereto. Based on an output signal from the fuel pressure sensor 36, the discharge amount of the fuel pump 35 is controlled such that the fuel pressure in the common rail 34 becomes a target fuel pressure.

A controller such as an electronic control unit (ECU) 40 is composed of a digital computer and provided with a ROM (read only memory) 42, a RAM (random access memory) 43, a CPU (microprocessor) 44, an input port 45 and an output port 46, which are interconnected with one another by a bidirectional bus 41. Output signals from the mass flow meter 21, air-fuel ratio sensor 27 and fuel pressure sensor 36 are input to the input port 45 via corresponding AD converters 47, respectively. Also, pulse signals output from the sensors 63 and 64 are input to the input port 45, respectively. Connected with an accelerator pedal 50 is a load sensor 51, which generates an output voltage proportional to a depression amount L of the accelerator pedal 50. The output voltage of the load sensor 51 is input to the input port 45 via a corresponding AD converter 47. A crank angle sensor 52, which generates a pulse every time a crank shaft rotates, for example, by 30°, is connected with the input port 45. The engine speed is calculated based on an output signal from the crank angle sensor 52. Also, a vehicle speed sensor 53, which generates a pulse corresponding to a vehicle speed, is connected with input port 45.

A navigation system 70 is connected with the input port 45. The navigation system 70 receives information signals such as the present driving position and traffic information. Traffic information includes the number of curves on the road or degree of slope, for example. Instead of the navigation system, another receiving device such as a radio which receives the aforementioned information can be used. The output port 46 is connected with the fuel injection valve 6, the stepping motor 19 for controlling the throttle valve 20, the stepping motor 30 for controlling the EGR control valve 31, and the fulel pump 35 via a corresponding driving circuit 48.

Figure 2:
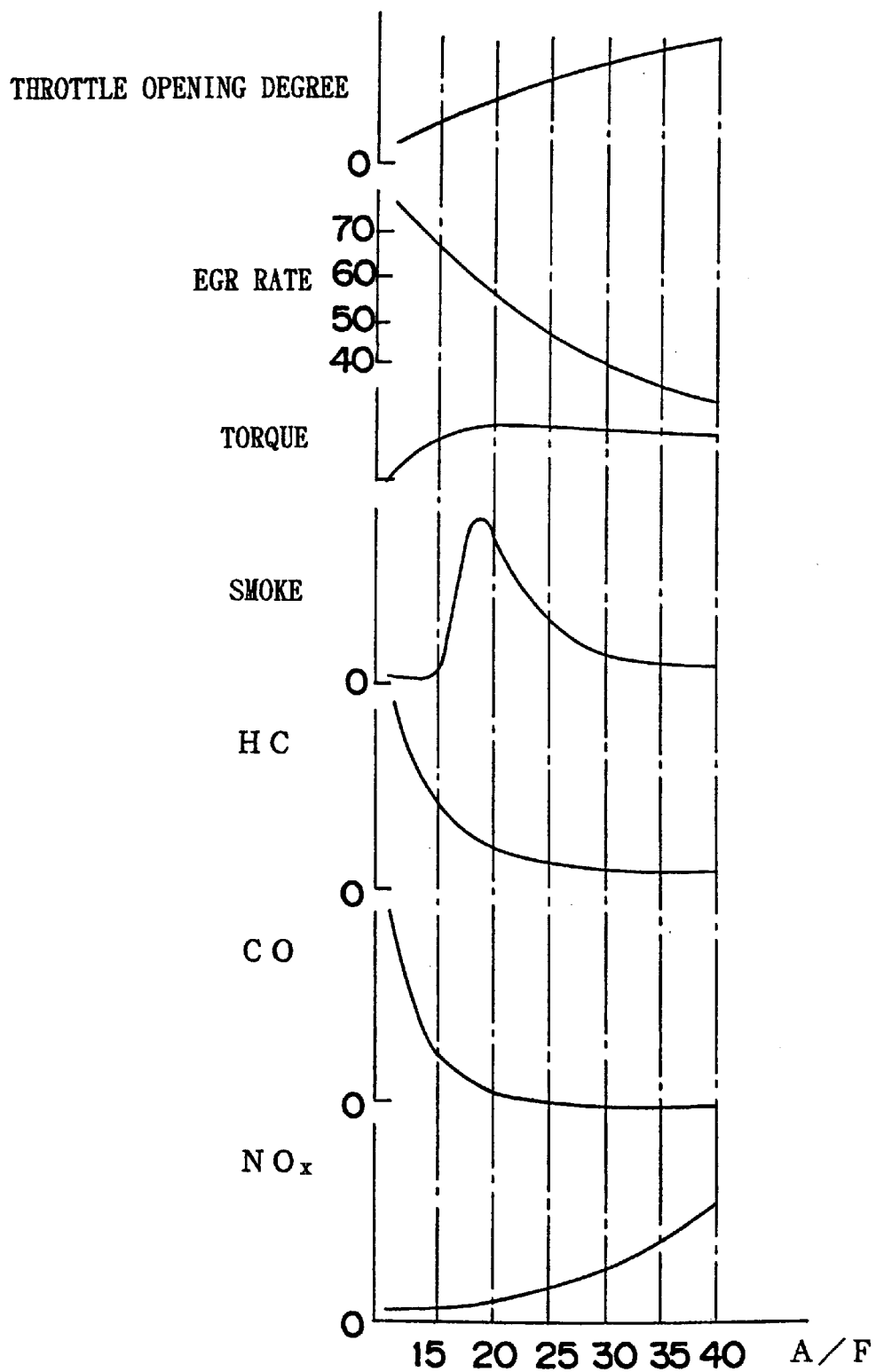
FIG. 2 shows graphs indicating the change of the throttle opening degree, the EGR rate, the torque, the generation amount of smoke, HC, CO and NOx, depending on the air fuel ratio, respectively.

FIG. 2 shows an experimental example of changes in output torque and changes in discharge amount of smoke, HC (hydrocarbon), CO and NOx in the case where the air-fuel ratio A/F (the horizontal axis in FIG. 2) is changed by changing an opening degree of the throttle valve 20 and an EGR rate at the time of a low-load operation of the engine. In this experimental example, the EGR rate becomes higher as the air-fuel ratio A/F becomes smaller. When the air-fuel ratio is equal to or smaller than a stoichiometric air-fuel ratio (about 14.6), the EGR rate is equal to or higher than 65%.

As shown in FIG. 2, if the air-fuel ratio A/F is made smaller by increasing the EGR rate (from the right-hand side to the left-hand side in the drawing), the generation amount of smoke starts increasing when the EGR rate reaches about 40% (when the air-fuel ratio A/F reaches about 30). Then, if the EGR rate is further increased (if the air-fuel ratio A/F is made smaller), the generation amount of smoke increases abruptly and reaches its peak. Then, if the EGR rate is further increased, the generation amount of smoke drops abruptly. When the EGR rate is equal to or higher than approximately 65% (when the air-fuel ratio A/F approaches 15.0), the generation amount of smoke becomes almost zero. That is, soot is hardly generated. At this time, the output torque of the engine drops slightly, and the generation amount of NOx becomes comparatively low. On the other hand, the generation amounts of HC and CO start increasing.

Figure 3A:
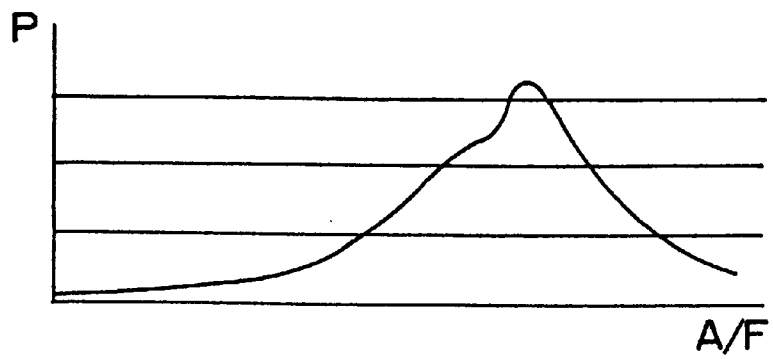
FIGS. 3A and 3B show the combustion pressure, depending on the air fuel ratio.
Figure 3B:
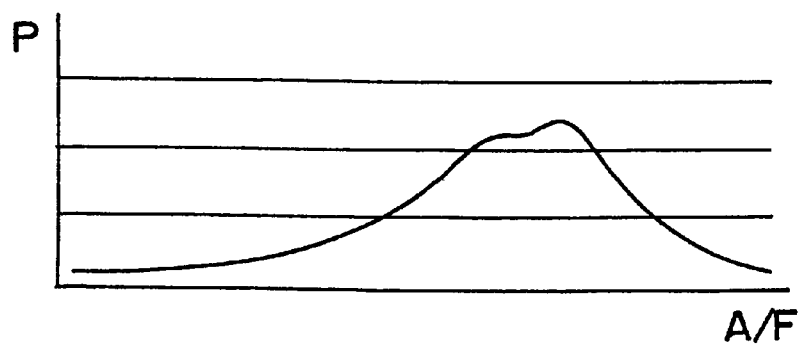

FIG. 3A shows changes in combustion pressure in the combustion chamber 5 when the air-fuel ratio A/F is in the vicinity of 21 and the generation amount of smoke assumes its maximum value. FIG. 3B shows changes in combustion pressure in the combustion chamber 5 when the air-fuel ratio A/F is in the vicinity of 18 and the generation amount of smoke is almost zero. As is apparent from the comparison of FIG. 3A with FIG. 3B, the combustion pressure is lower in the case where the generation amount of smoke is almost zero (FIG. 3B) than in the case where the generation amount of smoke is large (FIG. 3A).

The following conclusion can be drawn from the experimental results shown in FIGS. 2, 3A and 3B. That is, first of all, when the air-fuel ratio A/F is equal to or smaller than 15.0 and the generation amount of smoke is almost zero and the generation amount of NOx drops drastically, as can be seen from FIG. 2. The fact that the generation amount of NOx has dropped means that the combustion temperature in the combustion chamber 5 has dropped. Accordingly, when soot is hardly generated, it can be concluded that the combustion temperature in the combustion chamber 5 is low. The same conclusion can be drawn from FIG. 3B. That is, the combustion pressure is low in a state shown in FIG. 3B where soot is hardly generated. Therefore, in this state, it can be concluded that the combustion temperature in the combustion chamber 5 is low.

Secondly, as shown in FIG. 2, when the generation amount of smoke, namely, the generation amount of soot becomes almost zero, the discharge amounts of HC and CO increase. This means that hydrocarbon is discharged before growing into soot. In other words, the linear hydrocarbon or aromatic hydrocarbon contained in fuel as shown in FIG. 4 is thermally decomposed when heated in a state of oxygen deficiency, and a precursor of soot is formed. Then, soot that is composed of a solid phase of carbon atoms is produced. In this case, the actual process in which soot is produced is complicated, and it is unclear what state the precursor of soot assumes.

In any case, the hydrocarbon as shown in FIG. 4 grows into soot through the precursor of soot. Accordingly, as described above, when the generation amount of soot becomes almost zero, the discharge amounts of HC and CO increase as shown in FIG. 2. At this time, HC is either the precursor of soot or hydrocarbon in a state prior to the precursor of soot.

The above-described studies based on the experimental results shown in FIGS. 2, 3A and 3B are summarized as follows. That is, when the combustion temperature in the combustion chamber 5 is low, the generation amount of soot is almost zero. At this time, the precursor of soot or hydrocarbon in a state prior to the precursor of soot is discharged from the combustion chamber 5. As a result of more elaborate experiments and studies on this subject, it has been determined that the growing process of soot is stopped halfway, that is, no soot is generated in the case where the temperature of fuel and ambient gas in the combustion chamber 5 is equal to or lower than a certain temperature. When the temperature of fuel and ambient gas in the combustion chamber 5 becomes equal to or higher than the certain temperature, soot is generated.

The temperature of fuel and ambient gas at the time of stoppage of the process of producing hydrocarbon in a state prior to the precursor of soot, namely, the aforementioned certain temperature changes depending on various factors such as the type of fuel, air-fuel ratio, compression ratio and the like. Accordingly, it is impossible to provide a single, concrete value of the aforementioned certain temperature. However, the certain temperature is closely related to the generation amount of NOx and thus can be limited to a certain range judging from the generation amount of NOx. In other words, the higher the EGR rate becomes, the lower the temperature of fuel and ambient gas during combustion becomes. The higher the EGR rate becomes, the smaller the generation amount of NOx becomes. In this case, when the generation amount of NOx becomes about 10 ppm or less, soot is hardly generated. Accordingly, the aforementioned certain temperature virtually coincides with a temperature at which the generation amount of NOx becomes about 10 ppm or less.

Once soot has been produced, soot cannot be removed by means of an after-treatment that uses a catalyst having an oxidation function. On the other hand, the precursor of soot or hydrocarbon in a state prior to the precursor of soot can be removed easily by means of an after treatment that uses a catalyst having an oxidation function. If such an after-treatment that uses the catalyst having the oxidation function is taken into account, there is a great difference between the case where hydrocarbon is discharged from the combustion chamber 5 as the precursor of soot or in a state prior to the precursor of soot and the case where hydrocarbon is discharged from the combustion chamber 5 as soot. The important features of the novel combustion system employed in the present invention are that hydrocarbon is discharged from the combustion chamber 5 as the precursor of soot or in a state prior to the precursor of soot without producing soot in the combustion chamber 5 and that the hydrocarbon is oxidized by means of a catalyst having an oxidation function.

In order to stop the growth of hydrocarbon in a state prior to the production of soot (i.e., as the precursor), it is necessary to keep fuel and ambient gas in the combustion chamber 5 during combustion lower than a temperature at which soot is produced. In this case, it has been determined that the endothermic effect of ambient gas at the time of fuel combustion has an enormous effect in limiting the temperature of the fuel and ambient gas.

In other words, if there is only air around fuel, the evaporated fuel immediately reacts with oxygen in the air and burns. In this case, the temperature of the air that is located away from the fuel does not rise considerably, and only the air surrounding the fuel locally reaches a very high temperature. Namely, at this time, the air that is located away from the fuel is hardly subjected to the endothermic effect of the combustion heat of the fuel. In this case, since the combustion temperature locally becomes very high, the unburned hydrocarbon that has received the combustion heat produces soot.

On the other hand, if there is fuel in a mixture of a large amount of inert gas and a small amount of air, the results are different. In this case, the evaporated fu eel is diffused all around, reacts with the oxygen intermingled in the inert gas, and burns. In this case, since the inert gas in the periphery absorbs combustion heat, the combustion temperature does not rise considerably. Thus, the combustion temperature can be limited to a low temperature. Namely, the presence of inert gas plays an important role in limiting the combustion temperature, and the endothermic effect of the inert gas makes it possible to keep the combustion temperature low.

In this case, in order to keep fuel and ambient gas lower than a temperature at which soot is produced, a sufficient amount of inert gas that can absorb heat of an amount sufficient to achieve such a purpose is required. Accordingly, if the amount of fuel increases, the required amount of inert gas increases correspondingly. In this case, the larger the specific heat of inert gas becomes, the larger the endothermic effect thereof becomes. Hence, it is preferable that the specific heat of the inert gas is large. From this standpoint, since $CO_2$ and EGR gas have relatively large specific heats, it is preferable to use EGR gas as the inert gas.

FIG. 5 shows a relationship between EGR rate and smoke in the case where EGR gas is used as the inert gas and the cooling degree of the EGR gas is changed. Referring to FIG. 5, curve A represents a case where EGR gas is maintained at about 90° C. by cooling the EGR gas intensively, curve B represents a case where EGR gas is cooled by a compact cooling system, and curve C represents a case where EGR gas is not cooled forcibly.

As indicated by the curve A in FIG. 5, in the case where EGR gas is cooled intensively, the generation amount of soot reaches its peak when the EGR rate is slightly lower than 50%. In this case, if the EGR rate is set to about 55% or more, soot is hardly generated.

On the other hand, as indicated by the curve B, in the case where EGR gas is cooled by the compact cooling system, the generation amount of soot reaches its peak when the EGR rate is slightly higher than 50%. Therefore, in this case, if the EGR rate is set to about 65% or more, soot is hardly generated.

Further, as indicated by the curve C in FIG. 5, in the case where EGR gas is not cooled forcibly, the generation amount of soot reaches its peak when the EGR rate is in the vicinity of 55%. In this case, if the EGR rate is set to about 70% or more, soot is hardly generated.

FIG. 5 shows a generation amount of smoke when the engine load is relatively high. If the engine load decreases, the EGR rate at which the generation amount of soot reaches its peak drops slightly, and the lower limit of the EGR rate at which soot is hardly generated also drops slightly. Thus, the lower limit of the EGR rate at which soot is hardly generated changes depending on the cooling degree of EGR gas or the engine load.

Figure 6:
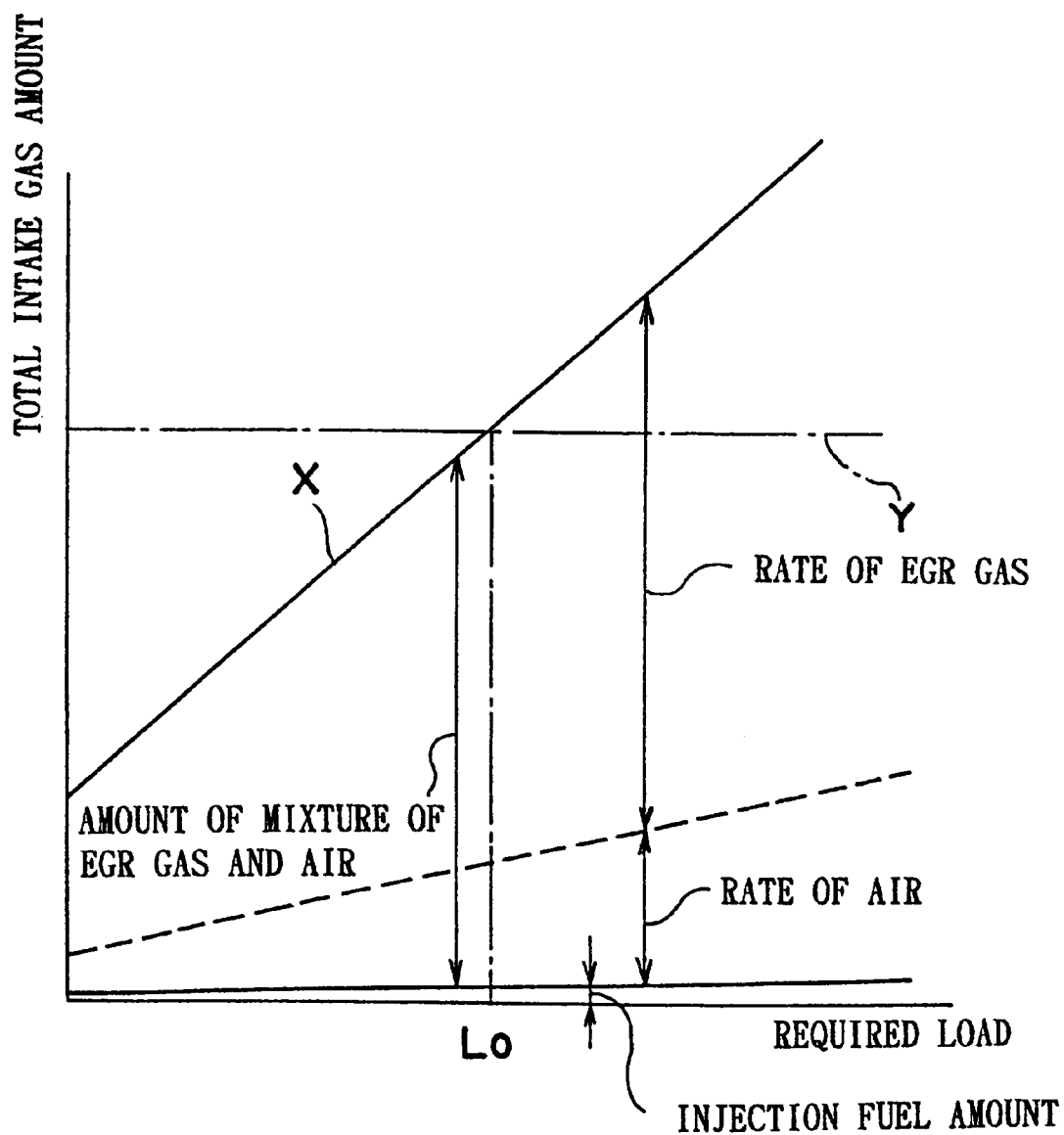
FIG. 6 shows a relationship between a total intake gas amount and a load requirement.

FIG. 6 shows an amount of the mixture of EGR gas and air and a proportion of air to EGR gas in the mixture, which are necessary to keep fuel and ambient gas during combustion lower than a temperature at which soot is generated, in the case where EGR gas is used as inert gas. In FIG. 6, the vertical axis represents a total intake gas amount admitted into the combustion chamber 5, and an alternate long and short dash line Y represents a total amount of intake gas that can be admitted into the combustion chamber 5 when the supercharging operation is not performed. Further, the horizontal axis represents a load requirement.

Referring to FIG. 6, the proportion of air, namely, the amount of air in the mixture represents an amount of air that is necessary for complete combustion of injected fuel. That is, in the case shown in FIG. 6, the ratio of the amount of air to the amount of injected fuel is equal to the stoichiometric air-fuel ratio. On the other hand, in FIG. 6, the proportion of EGR gas, namely, the amount of EGR gas in the mixture represents a minimum amount of EGR gas that is necessary to keep fuel and ambient gas lower than a temperature at which soot is formed. The aforementioned amount of EGR gas corresponds to an EGR rate of about 55% or more. In the embodiment shown in FIG. 6, the EGR rate is equal to or larger than 70%. Namely, in the case where the total amount of intake gas admitted into the combustion chamber 5 is represented by a solid line X in FIG. 6 and the ratio of the amount of air to the amount of EGR gas is set as shown in FIG. 6, the temperature of fuel and ambient gas becomes lower than a temperature at which soot is produced, and no soot is generated. At this time, the generation amount of NOx is about 10 ppm or less. Accordingly, the generation amount of NOx is very small.

If the amount of fuel injection increases, the combustion heat increases. Hence, in order to keep fuel and ambient gas temperature lower than a temperature at which soot is generated, it is necessary to increase an amount of heat absorbed by the EGR gas. Therefore, as shown in FIG. 6, the amount of EGR gas needs to be increased as the amount of fuel injection increases. In other words, it is necessary to increase an amount of EGR gas as the load requirement becomes higher.

Here, in the case where supercharging is not performed, the upper limit of the amount X of the total intake gas admitted into the combustion chamber 5 is Y. In FIG. 6, in an area having the load requirement larger than $L_0$, the air fuel ratio cannot be maintained at the stoichiometric air fuel ratio unless the EGR gas rate is reduced as the load requirement becomes greater. In other words, in the case where the air fuel ratio is intended to be maintained at the stoichiometric air fuel ratio in the area having the desired load larger than $L_0$ while supercharging is not performed, the EGR rate is reduced as the load requirement becomes high. Accordingly, in the area at the desired load larger than $L_0$, it is impossible to maintain the temperature of the fuel and the ambient gas to the value lower than the temperature at which soot is produced.

However, as shown in FIG. 1, when recirculating the EGR gas into the inlet side of the supercharger, that is, the air intake pipe 17 of the exhaust turbocharger 15 via the EGR passage 29, in the area when the load requirement is larger than $L_0$, it is possible to maintain the EGR rate to the level equal to or more than 55%, for example, 70%. Accordingly, the temperature of the fuel and the surrounding gas can be maintained to the value lower than the temperature at which soot is produced. That is, when recirculating the EGR gas so that the EGR rate within the air intake tube 17 becomes, for example, 70%, the EGR rate of the intake gas at the pressure boosted by the compressor 16 of the exhaust turbocharger 15 also becomes 70%. It is, thus, possible to maintain the temperature of the fuel and the ambient gas to the temperature at which soot is not produced as long as the compressor 16 is allowed to perform boosting. Accordingly, it is possible to expand the operation range of the engine which can produce the low temperature combustion. In this case, when setting the EGR rate to the level equal to or more than 55% in the area at the load requirement larger than $L_0$, the EGR control valve 31 is fully opened and the throttle valve 20 is slightly closed.

As mentioned above, FIG. 6 shows combustion of the fuel at the stoichiometric air-fuel ratio. Even when setting the air amount to be less than the air amount shown in FIG. 6, that is, setting the air-fuel ratio to the rich side, it is possible to restrict the generation amount of NOx to approximately 10 ppm or less while restricting soot generation. Further, even when setting the air amount to be larger than the air amount shown in FIG. 6, that is, setting the average value of the air fuel ratio to a lean value ranging from 17 to 18, it is possible to restrict the generation amount of NOx to approximately 10 ppm or less while restricting soot generation.

When the air fulel ratio is made rich, the fuel becomes excessive. However, since the combustion temperature is restricted to be low, the excessive fuel does not grow into soot, thus generating no soot. Further, at this time, only a significantly small amount of NOx is produced. On the contrary, when the average air-fuel ratio is lean, or even when the air-fuel ratio becomes the stoichiometric value, a small amount of soot may be generated at high combustion temperature in conventional systems. However, in accordance with the present invention, since the combustion temperature is restricted to be low, soot is hardly generated. Further, NOx is also hardly generated.

As mentioned above, when low-temperature combustion is performed, soot is not generated irrespective of the air fuel ratio. That is, regardless of whether the air fuel-ratio becomes rich or the stoichiometric air-fuel ratio, or the average air-fuel ratio becomes lean, only a small amount of NOx is generated. Accordingly, in view of improving the specific fuel consumption, it is preferable to set the average air-fuel ratio to lean.

In this case, fuel and ambient gas in the combustion chamber during combustion can be kept equal to or lower than a temperature at which the growth of hydrocarbon is stopped halfway, only when the engine load is relatively low, that is, when the exothermic value of combustion is small. Therefore, according to the embodiment of the present invention, when the engine load is relatively low, fulel and ambient gas during combustion is kept at a temperature lower than a temperature at which the growth of hydrocarbon is stopped halfway, and a first combustion mode, namely, the above-described low-temperature combustion is performed. When the engine load is relatively high, a second combustion mode, namely, a conventional combustion is performed. As is apparent from the foregoing description, when the first combustion mode, namely, the low-temperature combustion is performed, the amount of inert gas in the combustion chamber is larger than an amount of inert gas corresponding to a peak generation amount of soot, so that soot is hardly generated. When the second combustion mode, namely, the conventional combustion is performed, the amount of inert gas in the combustion chamber is smaller than the amount of inert gas corresponding to the peak generation amount of soot.

Figure 7:
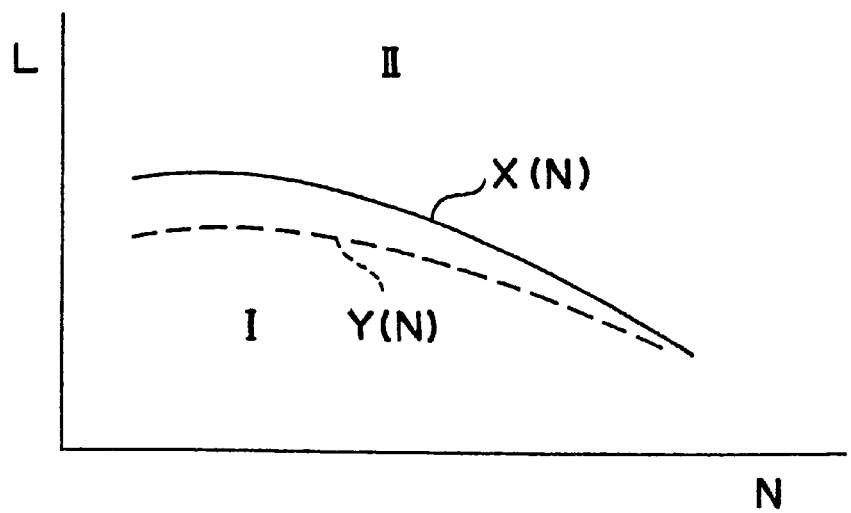
FIG. 7 shows a first operational area I and a second operational area II.

FIG. 7 shows an operational area I as a first operational area wherein the first combustion mode, namely, the low-temperature combustion is performed, and an operational area II as a second operational area wherein the second combustion mode, namely, the conventional combustion is performed. In FIG. 7, the vertical axis L represents a depression amount of the accelerator pedal 50, that is, the load requirement, and the horizontal axis N represents engine speed. Further, X(N) represents a first border between the first operational area I and the second operational area II, and Y(N) represents a second border between the first operational area I and the second operational area II. Based on the first border X(N), it is determined whether or not a transition from the first operational area I to the second operational area II has been made. Based on the second border Y(N), it is determined whether or not a transition from the second operational area II to the first operational area I has been made.

That is, when the operational state of the engine is in the first operational area I and low-temperature combustion is performed, when the load requirement L exceeds the first border X(N) which is a function of engine speed N, it is determined that a transition to the second operational area II has been made. Therefore, the conventional combustion is performed. Then, when the load requirement L becomes lower than the second border Y(N), it is determined that a transition to the first operational area I has been made. Therefore, the low-temperature combustion is performed again.

One reason why the first border X(N) and the second border Y(N), which is more inclined to a low-load side than the first border X(N), have been provided is that the combustion temperature is relatively high on a high-load side in the second operational area II, and the low-temperature combustion cannot be performed immediately even if the load requirement L has become lower than the first border X(N). In other words, unless the load requirement L has become comparatively low and dropped below the second border Y(N), the low-temperature combustion cannot be started immediately. Another reason is that a hysteresis is set to prevent fluctuations between the first operational area I and the second operational area II.

When the engine is in the first operational area I and the low-temperature combustion is performed, soot is hardly generated. Instead, unburned hydrocarbon is discharged from the combustion chamber 5 in the form of a precursor of soot or in a state prior to the precursor of soot. At this time, the unburned hydrocarbon that has been discharged from the combustion chamber 5 is suitably oxidized by the catalyst 25, which has an oxidation function.

As the catalyst 25, an oxidation catalyst, a three-way catalyst or an NOx absorber may be used. The NOx absorber has the functions of absorbing NOx when the average air-fuel ratio in the combustion chamber 5 is lean, and discharging the NOx when the average air-fuel ratio in the combustion chamber 5 is rich.

The NOx absorber has a carrier, for example, of alumina. On the carrier, for example, one of at least one material selected from an alkaline metal such as potassium (K), sodium (Na), lithium (Li) and cesium (Cs), an alkaline earth metal such as barium (Ba) and calcium (Ca), and rare earth metals such as lanthanum (La) and yttrium (Y) plus a noble metal such as platinum (Pt) are carried.

Not to mention the oxidation catalyst, the three-way catalyst and the NOx absorber also have the functions of oxidation. Therefore, as described above, the three-way catalyst and the NOx absorber can be employed as the catalyst 25.

Figure 8:
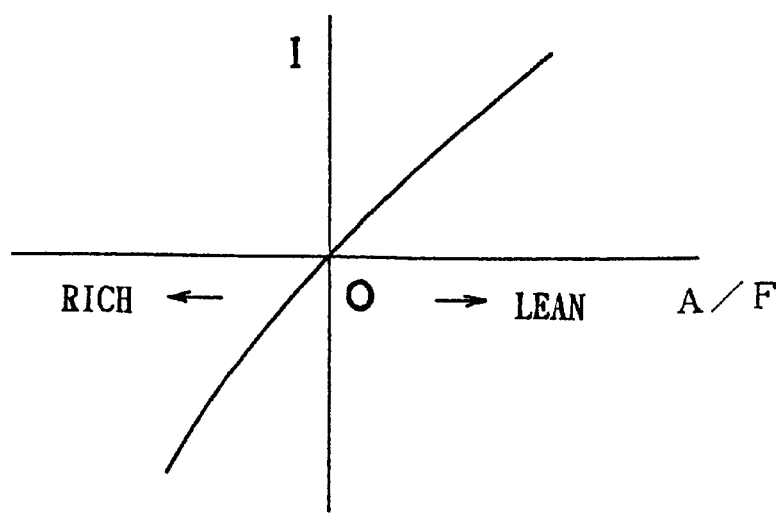
FIG. 8 shows an output of an air-fuel ratio sensor.

FIG. 8 shows the output of the air-fuel ratio sensor 27. As shown in FIG. 8, the output current I of the air-fuel ratio sensor 27 changes in accordance with the air-fuel ratio A/F. Therefore, the air-fuel ratio can be determined from the output current I of the air-fuel ratio sensor 27.

An outline of the operational control performed in the first operational area I and the second operational area II will now be explained with reference to FIG. 9.

Figure 9:
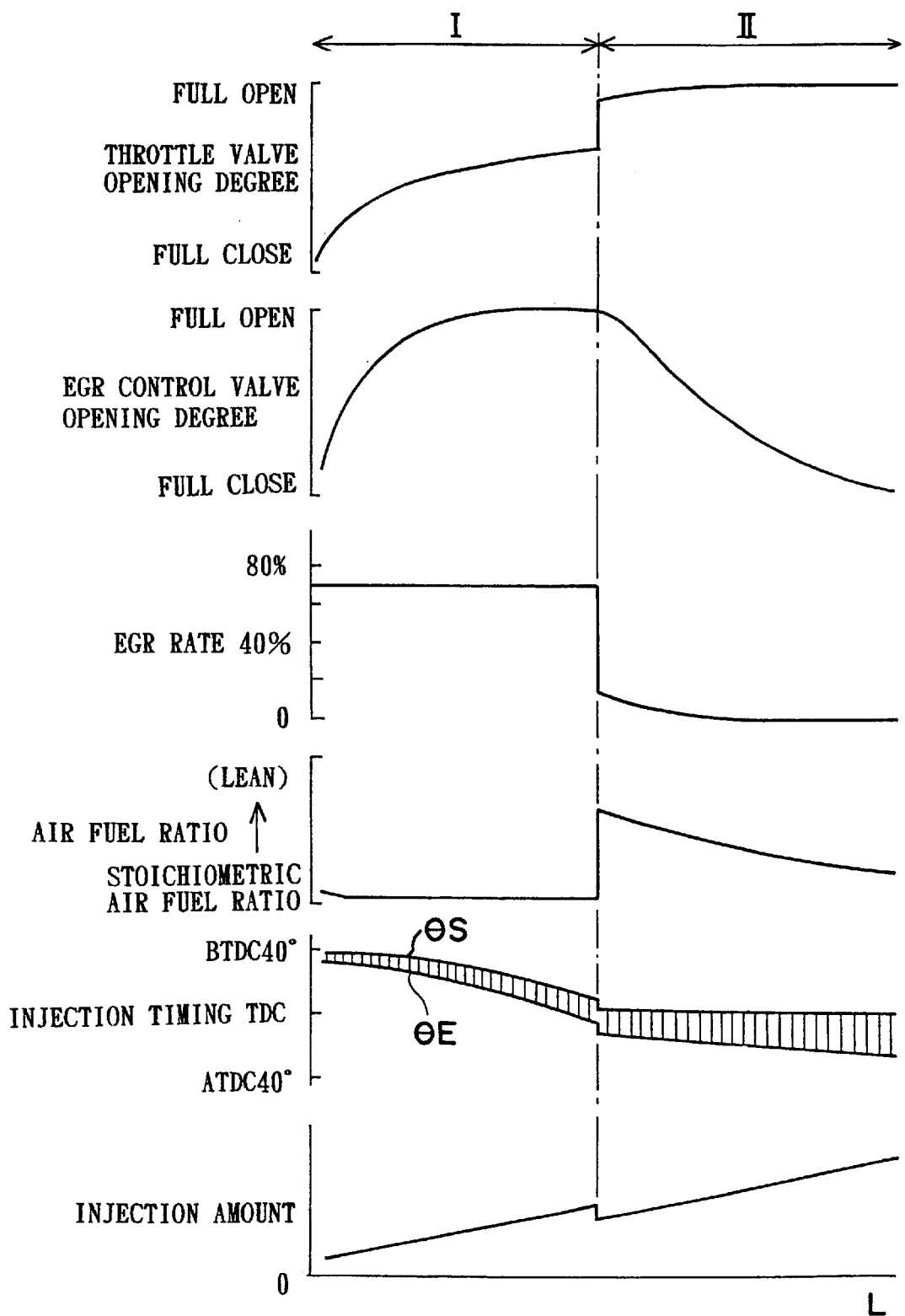

FIG. 9 shows changes in opening degree of the throttle valve 20, opening degree of the EGR control valve 31, EGR rate, air-fuel ratio, injection timing and injection amount in accordance with changes in load requirement L. As shown in FIG. 9, in the first operational area I where the load requirement L is low, as the load requirement L becomes higher, the opening degree of the throttle valve 20 gradually increases approximately from a completely closed state to an opening degree of ⅔. Further, as the load requirement L becomes higher, the opening degree of the EGR control valve 31 gradually increases approximately from a completely closed state to a completely open state. Further, according to an example shown in FIG. 9, the EGR rate is about 70% in the first operational area I, and the air-fuel ratio is slightly lean (a lean air-fuel ratio).

In other words, the opening degrees of the throttle valve 20 and the EGR control valve 31 are controlled such that the EGR rate is about 70% and the air-fuel ratio is slightly lean in the first operational area I. Further, in the first operational area I, fuel injection is carried out before the compression top dead center TDC. In this case, an injection start timing θS is retarded as the load requirement L becomes higher. Besides, an injection end timing θE is also retarded as the injection start timing θS is retarded.

During idling operation, the throttle valve 20 is closed until it is closed almost completely, and the EGR control valve 31 is closed until it is closed almost completely. If the throttle valve 20 is closed until it is closed almost completely, the pressure in the combustion chamber 5 at the beginning of compression becomes low. Hence, the compressive pressure becomes small. If the compressive pressure becomes small, the amount of compressive work done by the piston 4 becomes small, so that vibration of the engine body 1 is curbed. In other words, during an idling operation, in order to curb vibration of the engine body 1, the throttle valve 20 is closed until it is closed almost completely.

On the other hand, if the engine undergoes a transition from the first operational area I to the second operational area II, the opening degree of the throttle valve 20 increases stepwise from an opening degree of ⅔ toward a completely open state. At this time, according to the example shown in FIG. 9, the EGR rate decreases stepwise from about 70% to 40% or less, and the air-fuel ratio increases stepwise. That is, since the EGR rate goes through a range shown in FIG. 5 where a large amount of smoke is generated, a large amount of smoke is briefly generated when the engine undergoes a transition from the first operational area I to the second operational area II.

In the second operational area II, the conventional combustion is performed. In the second operational area II, apart from a few exceptional portions, the throttle valve 20 is held in a completely open state, and the opening degree of the EGR control valve 31 is gradually reduced as the load requirement L becomes higher. In the second operational area II, the EGR rate becomes lower as the load requirement L becomes higher, and the air-fuel ratio becomes smaller as the load requirement L becomes higher. However, the air-fuel ratio remains lean even if the load requirement L has become high. Further, the injection start timing θS is in the vicinity of the compressive top dead center TDC.

Figure 10A:
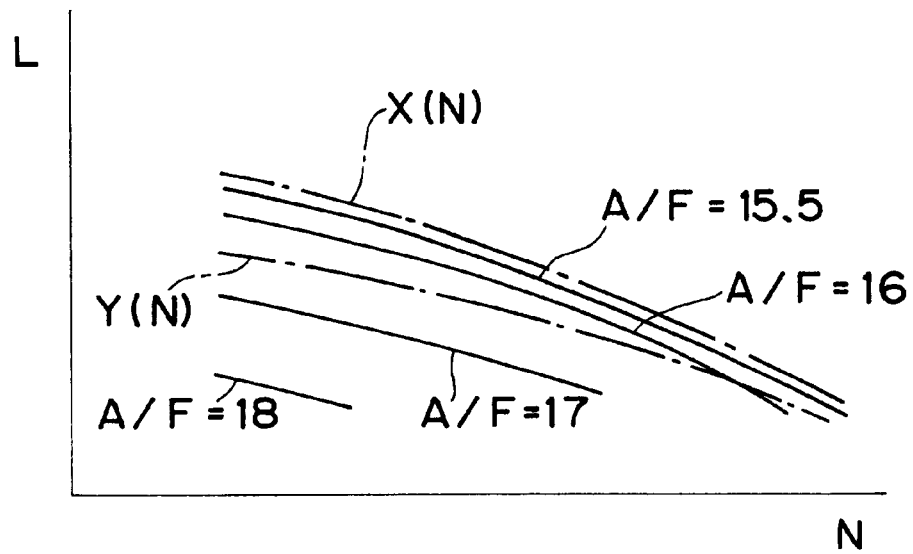
FIG. 10A shows an air-fuel ratio in the operational area I.

FIG. 10A shows a target air-fuel ratio A/F in the first operational area I. Referring to FIG. 10A, curves indicated by A/F=15.5, A/F=16, A/F=17 and A/F=18 represent the cases where the air-fuel ratio is 15.5, 16, 17 and 18 respectively. The air-fuel ratios between the respective curves are determined by means of proportional distribution. In the first operational area I, the target air-fuel ratio is lean. As the load requirement L becomes lower, the target air-fuel ratio A/F is shifted toward the lean side.

In other words, as the load requirement L becomes lower, the combustion heat decreases. Accordingly, as the load requirement L becomes lower, the low-temperature combustion can be performed more easily even if the EGR rate has been reduced. If the EGR rate is reduced, the air-fuel ratio becomes larger. Therefore, as shown in FIG. 10A, as the load requirement L becomes lower, the air-fuel ratio A/F is made larger. The larger the air-fuel ratio A/F becomes, the more the rate of fuel consumption is improved. Thus, in order to set the air-fuel ratio toward the lean side to the maximum possible extent, according to this embodiment, the air-fuel ratio A/F is made larger as the load requirement L becomes lower.

Figure 10B:
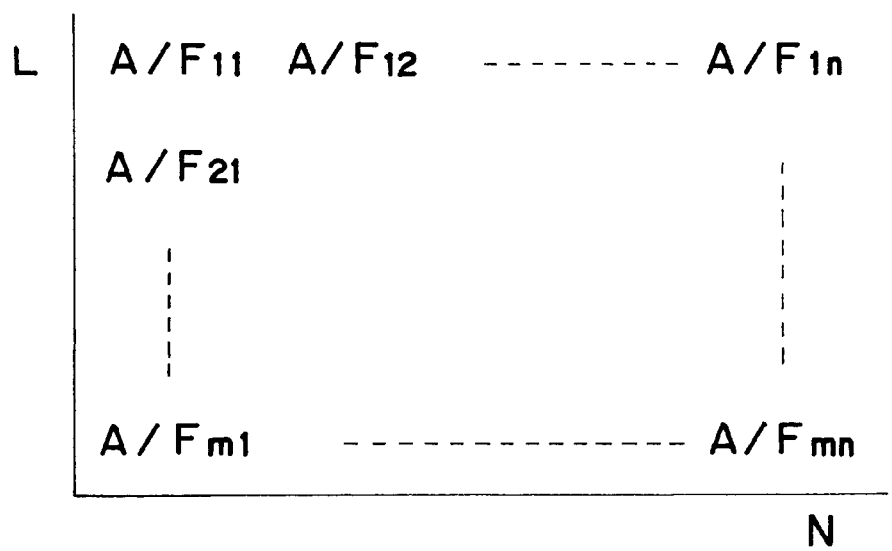
FIG. 10B shows an air-fuel ratio map.
Figure 11A:
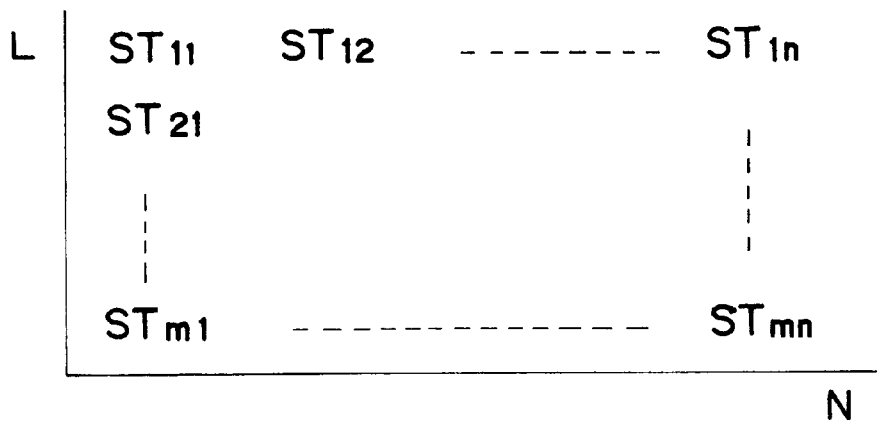
Figure 11B:
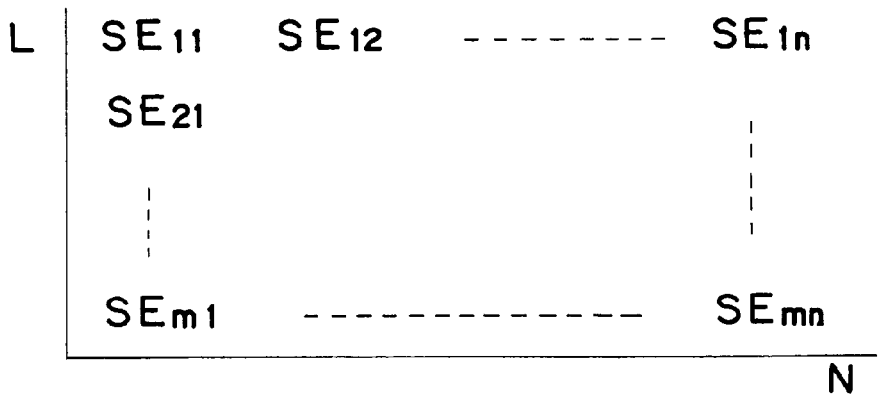

In this case, the target air-fuel ratio A/F is preliminarily stored in the ROM 42 as a function of the load requirement L and the engine speed N in the form of a map as shown in FIG. 10B. Additionally, a target opening degree ST of the throttle valve 20 and a target opening degree SE of the EGR control valve 31 required for setting the air-fuel ratio to the target air-fuel ratio A/F shown in FIG. 10A are preliminarily stored in the ROM 42 as a function of the load requirement L and the engine speed N in the form of maps as shown in FIGS. 11A and 11B, respectively.

Figure 12A:
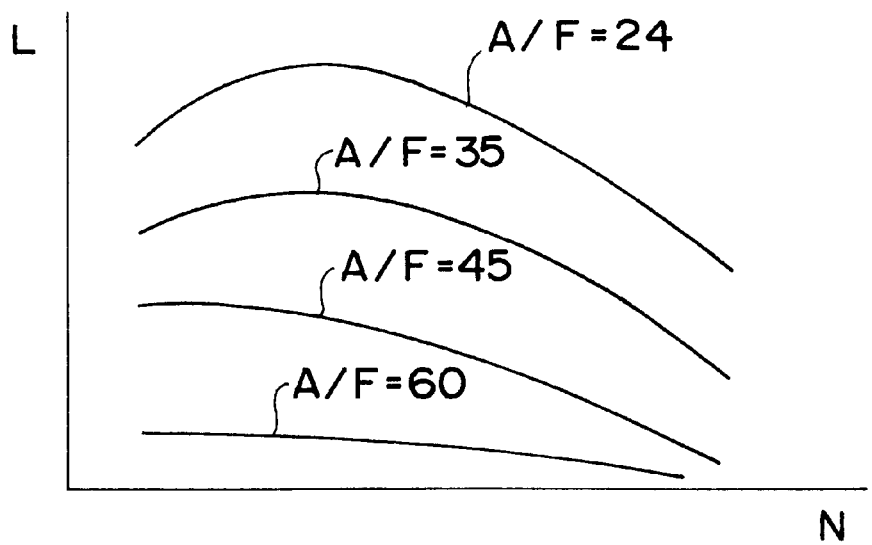
FIG. 12A shows an air-fuel ratio during a second combustion mode.
Figure 12B:
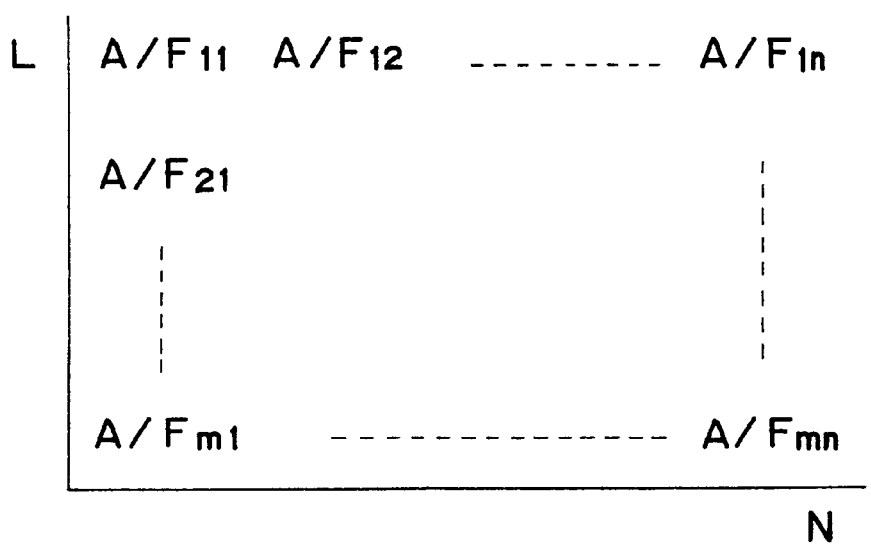
FIG. 12B shows a map of an air-fuel ratio during the second combustion mode.
Figure 13A:
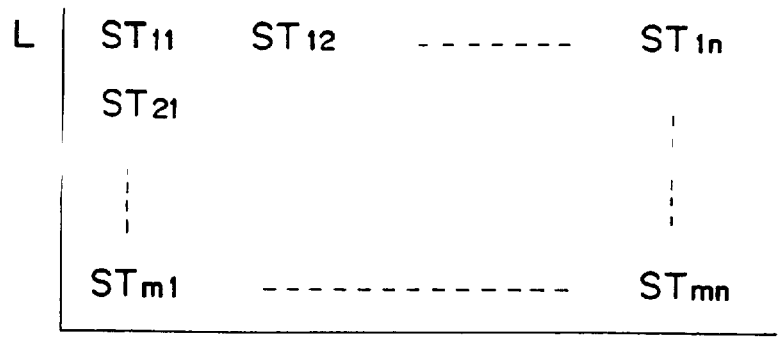
Figure 13B:
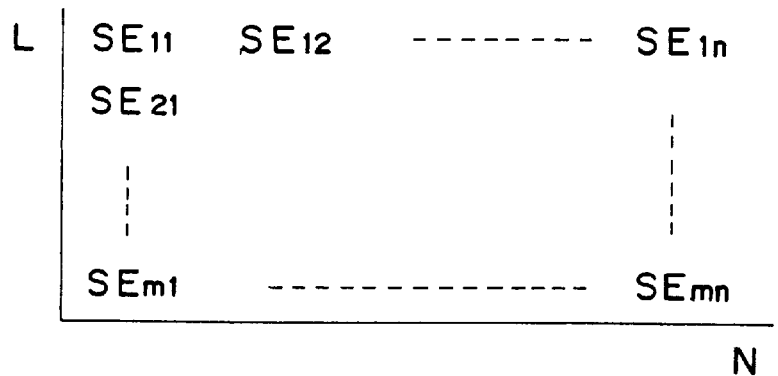

FIG. 12A shows the target air fuel ratio in the second operational area 11, that is, when the conventional combustion is performed. Referring to FIG. 12A, curves indicated by A/F=24, A/F=35, A/F=45 and A/F=60 represent the cases where the air-fuel ratio is 24, 35, 45 and 60 respectively. In this case, the target air-fuel ratio A/F is preliminarily stored in the ROM 42 as a function of the load requirement L and the engine speed N in the form of a map as shown in FIG. 12B. Additionally, a target opening degree ST of the throttle valve 20 and a target opening degree SE of the EGR control valve 31 required for setting the air-fuel ratio to the target air-fuel ratio A/F shown in FIG. 12A are preliminarily stored in the ROM 42 as a function of the load requirement L and the engine speed N in the form of maps as shown in FIGS. 13A and 13B, respectively.

Figure 14:
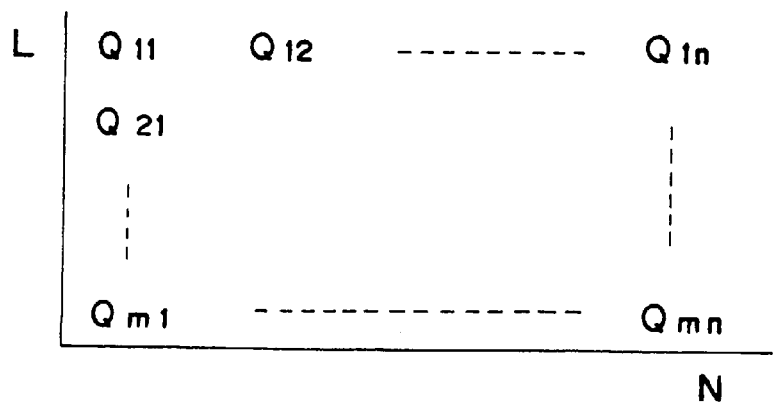
FIG. 14 shows a map of a fuel injection amount.

Further, the injection amount Q when the second combustion mode is performed is calculated based on the load requirement L and engine speed N. The injection amount Q is preliminarily stored in the ROM 42 as a function of the load requirement L and the engine speed N in the form of a map as shown in FIG. 14.

Figure 15:
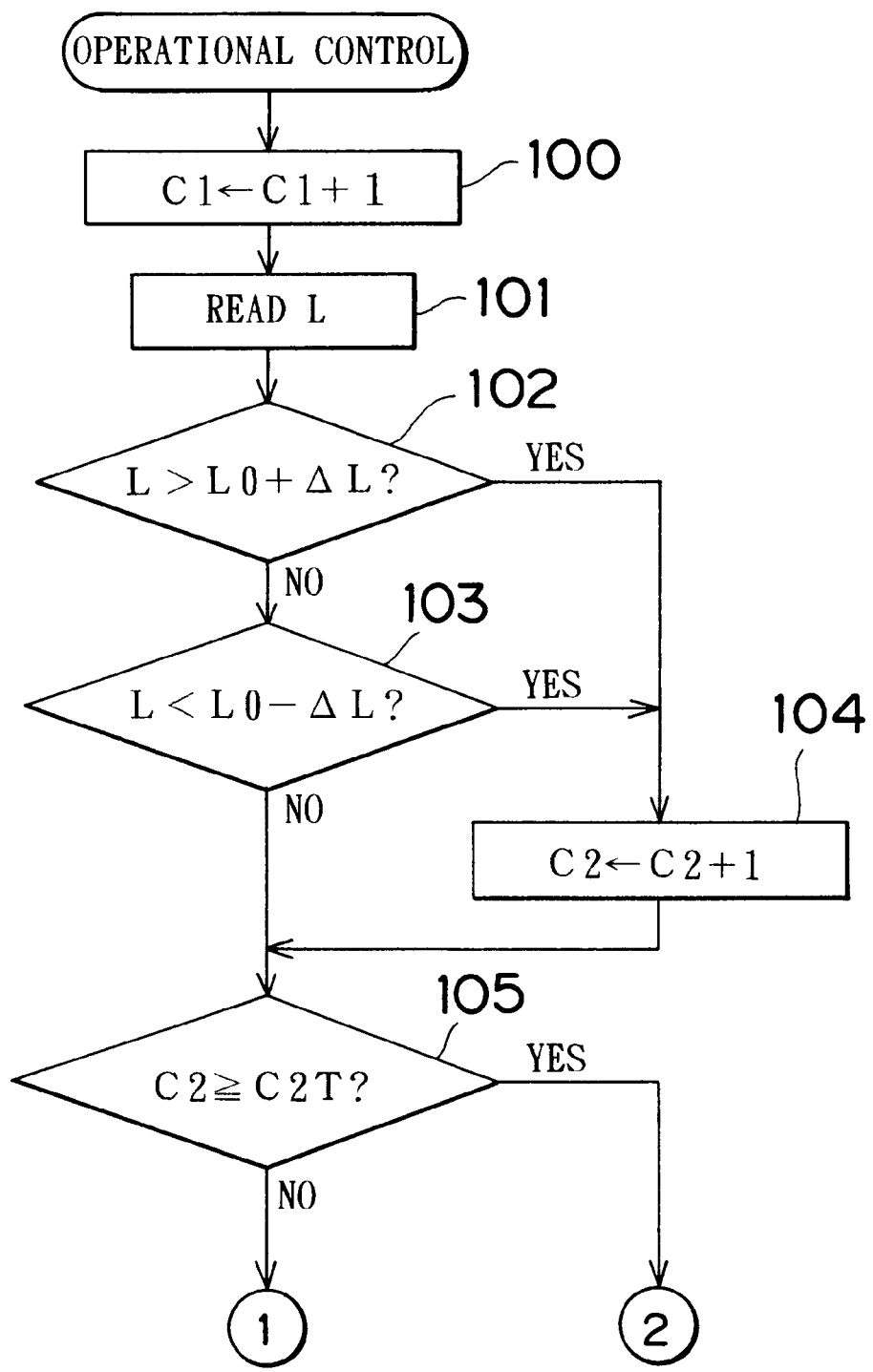
FIGS. 15, 16 and 17 are flowcharts for controlling operation of the engine according to a first embodiment of the present invention.

Next, an explanation will be given of the operation control of the embodiment with reference to FIG. 15 to FIG. 17.

At first, in step 100, a counter C1, which counts the number of readable data of load L is incremented (C1←C1+1). Next, in step 101, a load L detected by the load sensor 51 is read. Next, in step 102, it is determined whether or not the read load L is larger than the sum of the preceding read load L0 and a predetermined value ΔL. If it is determined in step 102 that L>L0+ΔL (YES), it is determined that the load L has been changed, and then the process goes to step 104. On the other hand, if it is determined that L≦L0+ΔL, that is NO in step 102, the process goes to step 103. In step 103, it is determined whether or not the read load L is less than the value calculated by subtracting the predetermined value ΔL from the preceding read load L0. If it is determined in step 103 that L<L0−ΔL (YES), it is determined that the load L has been changed, and then the process goes to step 104. On the other hand, if it is determined that L≧L0−ΔL, that is NO in step 103, it is determined that the load L has not been changed, and then the process goes to step 105.

Then in step 104, a counter C2 is incremented (C2←C2+1). The counter C2 counts the number of the data of load L which has been changed as compared with the preceding load L0. In step 105, it is determined whether or not C2 is equal to or larger than a predetermined threshold value C2T. If it is determined in step 105 that C2≧C2T (YES), it is determined that the frequency of change of the load L is high, and then the process goes to step 116. Namely, it is determined that the frequency of transition between the combustion modes, the first combustion mode (low-temperature combustion) and the second combustion mode (conventional combustion), is high. In step 116, the second combustion mode is performed and execution of the first combustion mode is prohibited. If it is determined in step 105 that C2<C2T (NO), then the process goes to step 106.

In step 106, it is determined whether or not a flag I indicating that the engine is in the first operational area I has been set. If the flag I has been set, the process proceeds to step 107, where it is determined whether or not the load requirement L has become larger than the first border X(N). When the relation L≦X(N) is established, the process proceeds to step 111, where low-temperature combustion is performed.

If it is determined in step 107 that L>X(N), the process proceeds to step 108, where the flag I is reset. The process then proceeds to step 116, where the second combustion mode is performed.

On the other hand, if it is determined in step 106 that the flag I has not been set, the process proceeds to step 109, where it is determined whether or not the load requirement L has become smaller than the second border Y(N). When the relation L≧Y(N) is established, the process proceeds to step 116, where the second combustion mode is performed under a lean air-fuel ratio.

If it is determined in step 109 that L<Y(N), the process proceeds to step 110, where the flag I is set. The process then proceeds to step 111, where the first combustion mode is performed.

Next, in step 111, a target opening degree ST of the throttle valve 20 is calculated from the map shown in FIG. 11A, and the opening degree of the throttle valve 20 is set to the thus-calculated opening degree ST. In step 112, a target opening degree SE of the EGR control valve 31 is calculated from a map shown in FIG. 11B, and the opening degree of the EGR control valve 31 is set to the thus-calculated target opening degree SE. Then, in step 113, a mass flow rate Ga of the inlet air (hereinafter referred to simply as an amount of inlet air Ga), which is detected by the mass flow meter 21, is read, and next, in step 114, the target air-fuel ratio A/F is calculated from the map shown in FIG. 10B. Next, in step 115, a fuel injection amount Q necessary for setting the air-fuel ratio to the target air-fuel ratio A/F is calculated.

As mentioned above, in the case where the low-temperature combustion is performed, when the load requirement L or the engine speed N is changed, the opening degree of the throttle valve 20 and the opening degree of the EGR control valve 31 are immediately made to coincide with the target opening degrees ST and SE corresponding to the load requirement L and the engine speed N. Accordingly, for example, when the load requirement L is increased, the amount of the air within the combustion chamber 5 is immediately increased, so that the torque generated by the engine is immediately increased.

On the other hand, when the intake air amount is changed such that the opening degree of the throttle valve 20 or the opening degree of the EGR control valve 31 is changed, the change of the intake air amount Ga is detected by the mass flow meter 21, and the fuel injection amount Q is controlled on the basis of the detected intake air amount Ga. That is, the fuel injection amount Q is changed after the intake air amount Ga is actually changed.

In step 116, the target fuel injection amount Q is calculated from the map shown in FIG. 14, and the fulel injection amount is set to the thus-calculated target fuel injection amount Q. Next, in step 117, the target opening degree ST of the throttle valve 20 is calculated from the map shown in FIG. 13A. Next, in step 118, the target opening degree of the EGR control valve 31 is calculated from the map shown in FIG. 13B, and the opening degree of the EGR control valve 31 is set to the target opening degree SE.

Next, in step 119, the intake air amount Ga detected by the mass flow meter 21 is read. Next, in step 120, the actual air fuel ratio $(A/F)_R$ is calculated on the basis of the fuel injection amount Q and the intake air amount Ga. Next, in step 121, the target air fuel ratio A/F is calculated from the map shown in FIG. 12B. Next, in step 122, it is determined whether or not the actual air fuel ratio $(A/F)_R$ is greater than the target air fuel ratio A/F. If it is determined that $(A/F)_R > A/F$, the process goes to step 123 where the correction value AST of the throttle opening degree is reduced only by the predetermined value a, and then the process goes to step 125. On the contrary, when the relation $(A/F)_R \leq A/F$ is established, the process goes to step 124 where the correction value ΔST is increased only by the fixed value α, and then the process goes to step 125. In step 125, the final target opening degree ST is calculated by adding the correction value AST to the target opening degree ST of the throttle valve 20, and the opening degree of the throttle valve 20 is set to the final target opening degree ST. That is, the opening degree of the throttle valve 20 is controlled such that the actual air fuel ratio $(A/F)_R$ becomes the target air fuel ratio A/F.

As mentioned above, in the case where the second combustion mode is performed, when the load requirement L or the engine speed N is changed, the fuel injection amount is immediately made to coincide with the target fuel injection amount Q corresponding to the load requirement L and the engine speed N. For example, when the load requirement L is increased, the fuel injection amount is immediately increased such that the torque generated by the engine is immediately increased.

On the other hand, when the air fuel ratio is shifted from the target air-fuel ratio A/F as the fuel injection amount Q is increased, the opening degree of the throttle valve 20 is controlled such that the air-fuel ratio becomes the target air-fuel ratio A/F. That is, the air-fuel ratio is changed after the fuel injection amount Q is changed.

In this embodiment, during the low-temperature combustion, the fuel injection amount Q is controlled by open-loop control, while during the second combustion mode, the air-fuel ratio is controlled by changing the opening degree of the throttle valve 20. However, the fuel injection amount Q also can be controlled by feedback control based on an output signal of the air-fuel ratio sensor 27, when the lower-temperature combustion is performed. On the other hand, when the second combustion mode is performed, the air-fuel ratio can be controlled by changing the opening degree of the EGR control valve 31.

In step 126, the preceding load L0 is renewed (L0←L), namely, the current load L is substituted for preceding load L0. Next, in step 127, the counter C1 is compare with the predetermined threshold value C1T. When the relationship C1<C1T is established, that is NO in step 127, it is determined that the number of data is not enough to determine whether or not the frequency of change of the load L is high, and then the routine is closed. On the contrary, when the relationship C1≧C1T is established, that is YES in step 127, it is determined that the decision regarding the frequency of the change of the load L has been finished, and then the counters C1 and C2 are reset in steps 128 and 129 respectively, for the next operation of the routine.

In the above mentioned embodiment, it is presupposed whether or not an operational state of the engine is in the state where the first combustion mode and the second combustion mode are switched frequently. When the operational state of the engine is in a high frequent state, that is the frequency of the change of the load is high, the execution of the first combustion mode is prohibited. Namely, only the second combustion mode is performed during the high frequent state. As a result, it is possible to reduce an undesirable situation where a generation amount of soot is increased in accordance with the transition between the first combustion mode and the second combustion mode.

A second embodiment of the present invention will now be described. The structure of the embodiment is the same as the first embodiment shown in FIG. 1.

Figure 18:
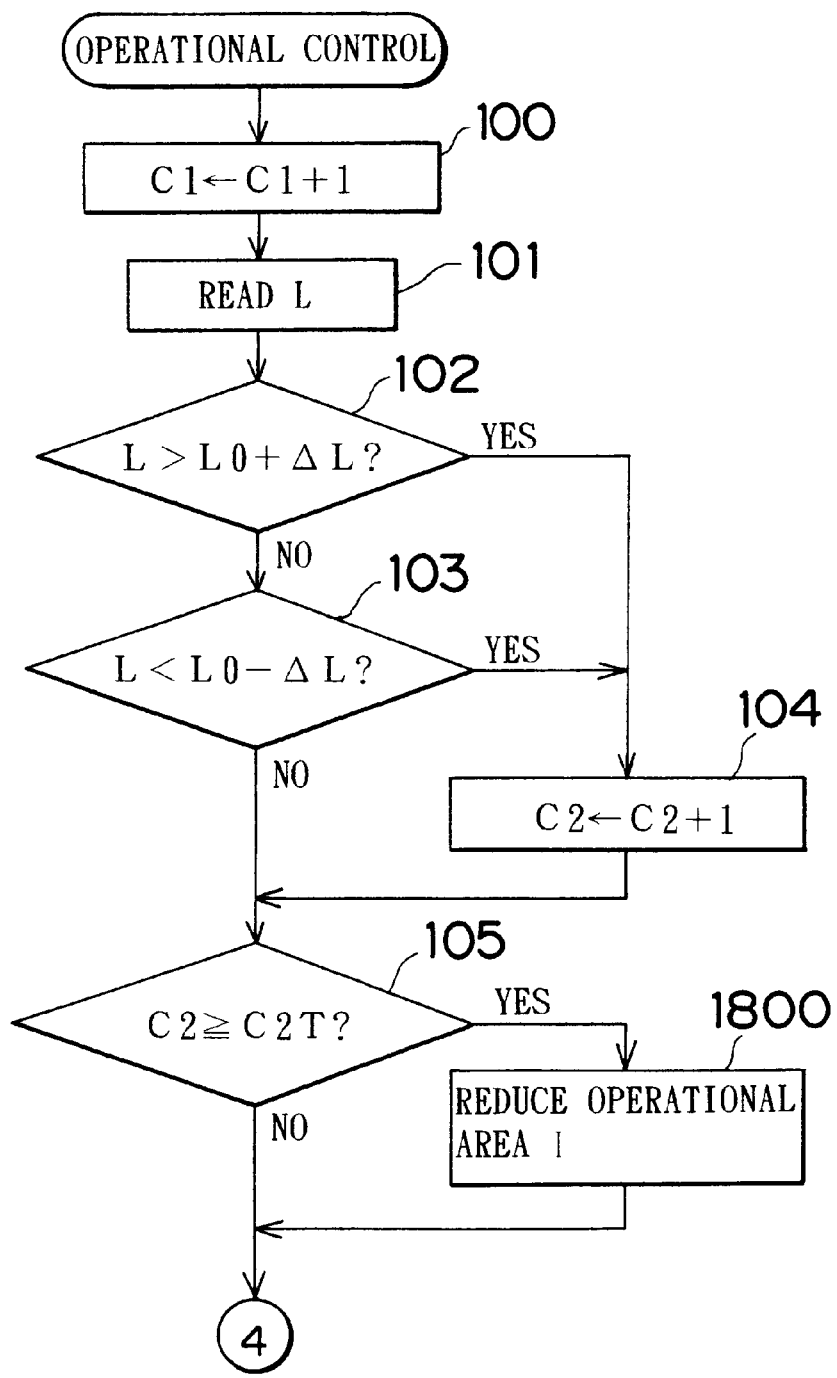
FIGS. 18, 19 and 20 are flowcharts for controlling operation of the engine according to a second embodiment of the present invention.

An explanation will be given of the operation control of the embodiment with reference to FIG. 18 to FIG. 20 focusing on processes that are different from the first embodiment. Hereinafter, the description of the steps having the same numbers as mentioned above will be omitted.

Figure 21:
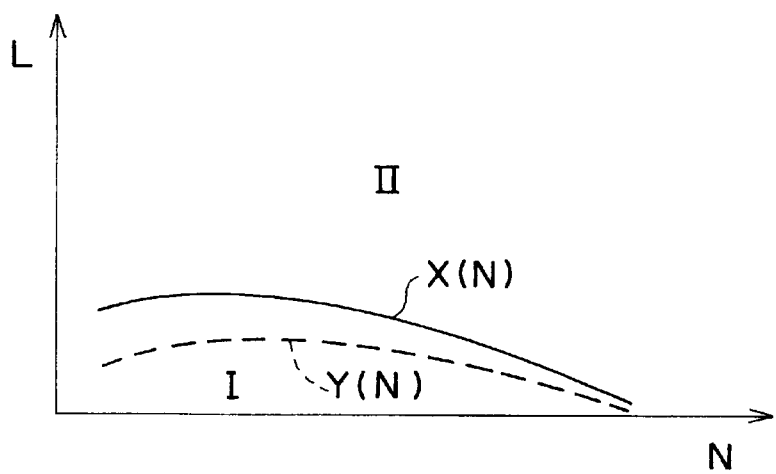
FIG. 21 shows a first operational area I and a second operational area II.

In the second embodiment, in step 105, if it is determined that C2≧C2T (YES), the process proceeds to step 1800. In that case, the first operational area I and the second operational area II are adjusted to be as shown in FIG. 21. As will be understood from a comparison of FIG. 7 and FIG. 21, the first operational area I is reduced in this embodiment. Therefore the first combustion mode is hardly performed. On the contrary, if NO is determined in step 105, the process proceed to step 106 without reduction of the first operational area I. Namely, in that case, the first operational area I and the second operational area II are shown in FIG. 7 rather than FIG. 21.

Figure 16:
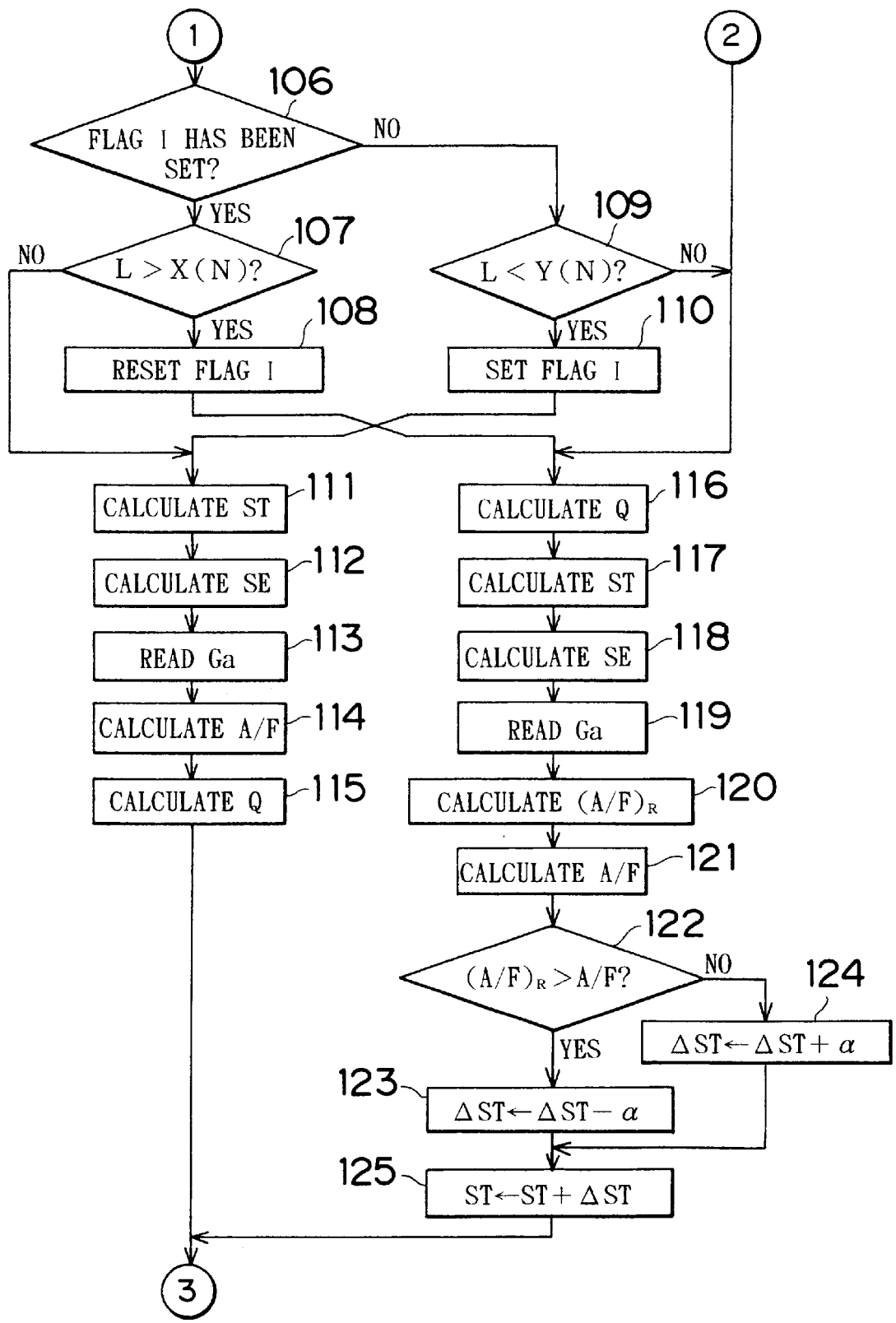
Figure 17:
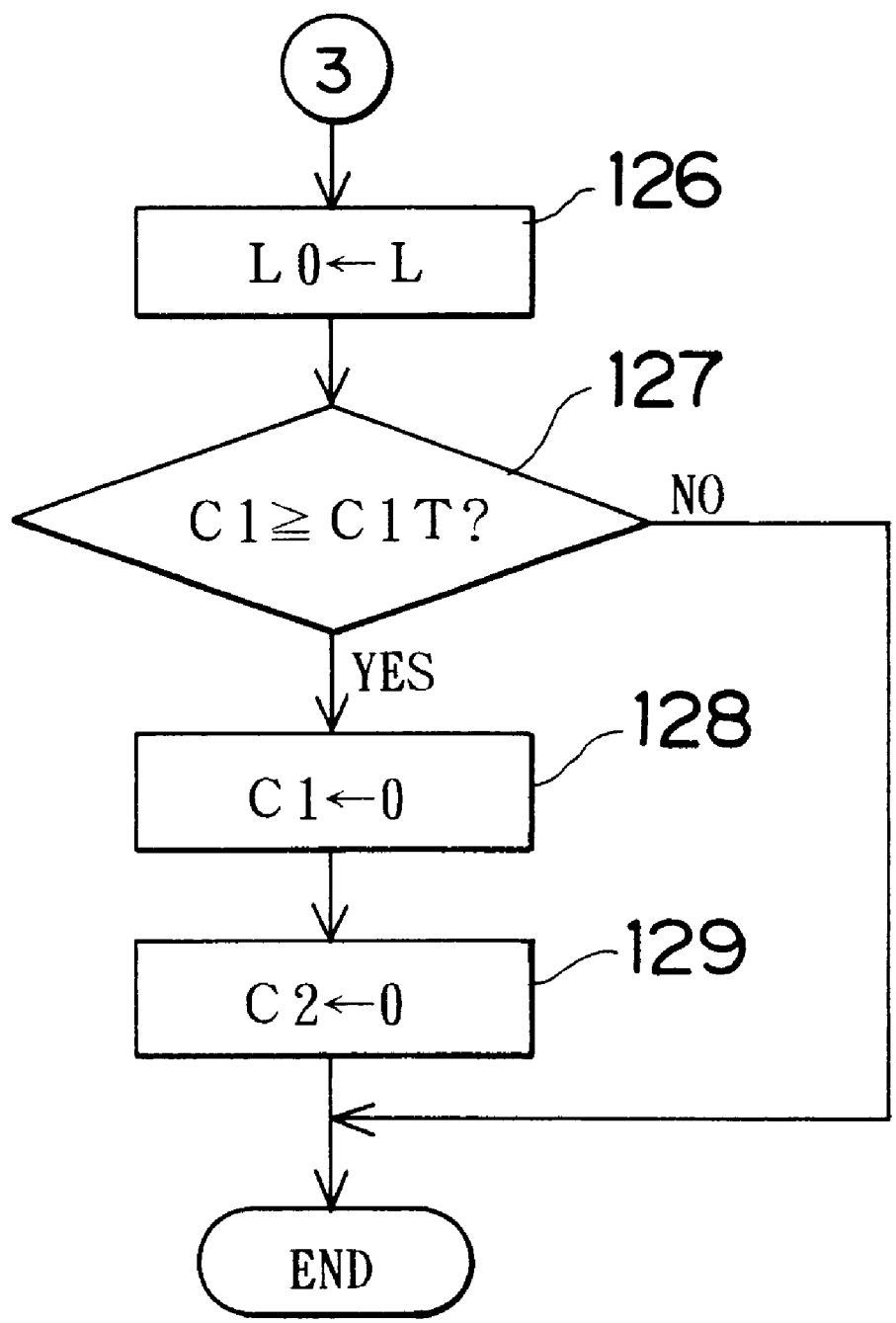
Figure 19:
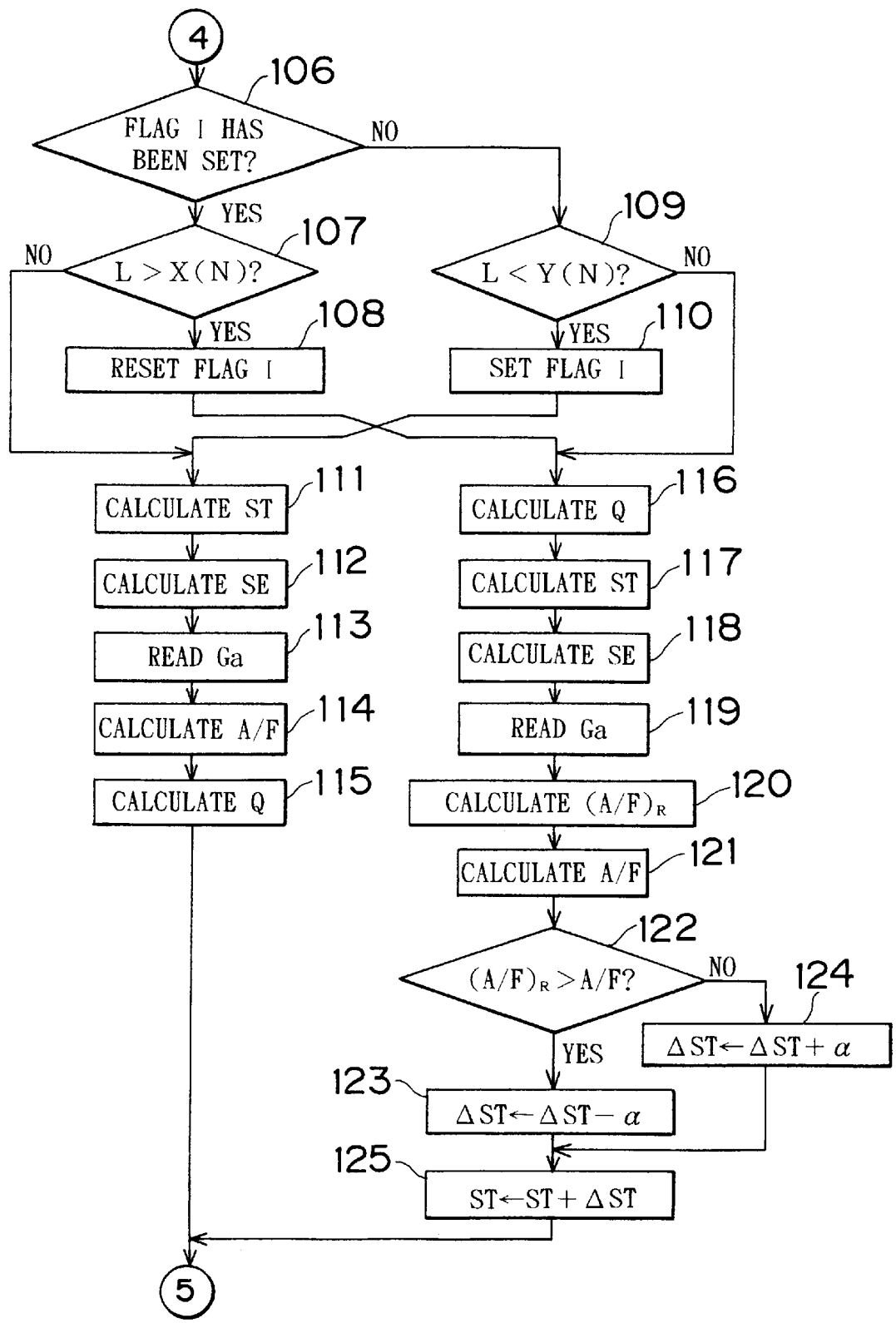
Figure 20:
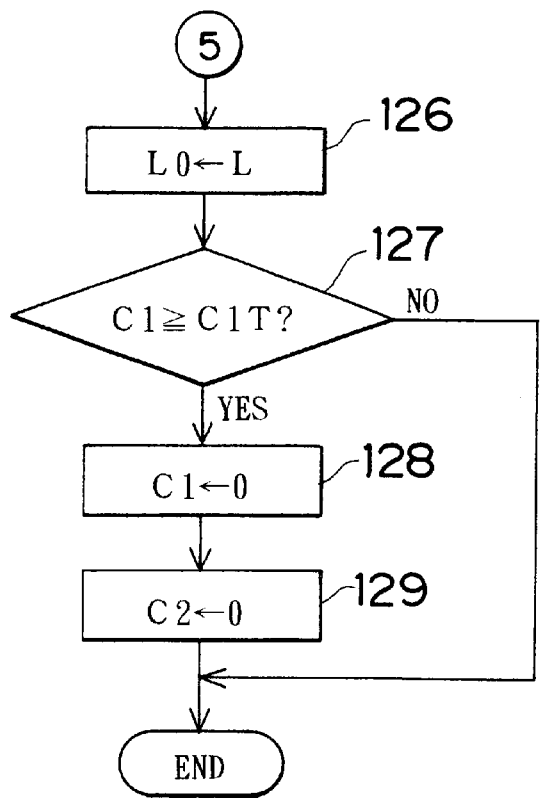

The follow steps shown in FIGS. 19 and 20 are the same as the steps shown in FIGS. 16 and 17, and therefore an explanation for these steps is omitted.

In the second embodiment, it is determined whether or not an operational state of the engine is in the state where switching occurs often between the first combustion mode and the second combustion mode. When the operational state of the engine is in a high frequent state, that is the frequency of the change of the load is high, the first operational area I, where the first combustion mode is performed, is reduced. Namely, the first combustion mode is hardly performed, and then the number of times of switching between the first mode and the second mode is reduced. As a result, it is possible to reduce an undesirable situation where a generation amount of soot is increased in accordance with the transition between the first combustion mode and the second combustion mode.

Figure 22:
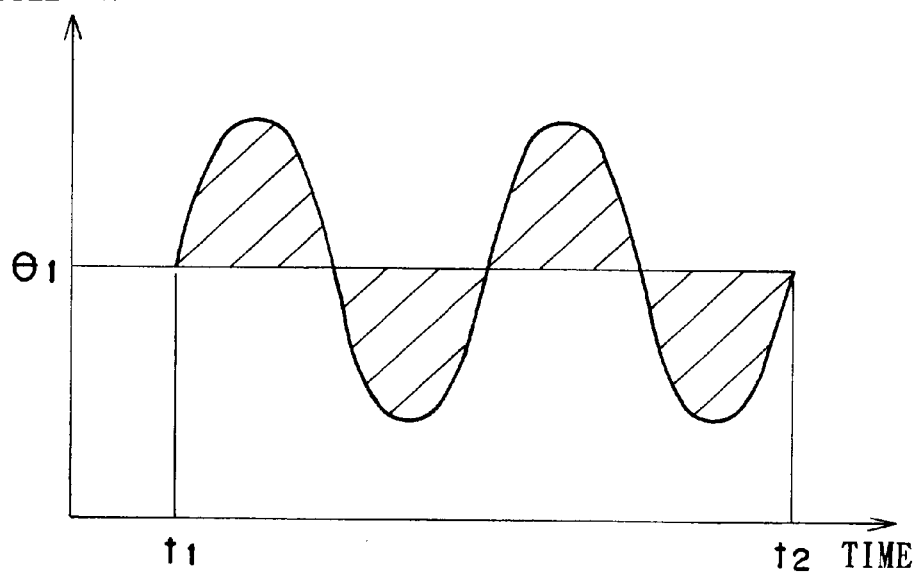
FIG. 22 shows a graph of an opening degree of the throttle valve as a function of time.

Further, in the above mentioned embodiments, the determination whether or not the load L has been changed is executed in every routine. However, it is also possible to determine that the frequency of the change of the load L is high as follows. FIG. 22 shows a graph of an opening degree of the throttle valve as a function of time. In the graph, each hatching portion means an absolute integrated value of the opening degree of the throttle valve. If an absolute integrated value or a squared integrated value of the measurement value, for example an opening degree of the throttle valve, which is measured between t1 and t2 as shown in FIG. 22, is greater than the predetermined value, it is possible to determine that the frequency of change of the load L is high. As the measurement value, a vehicle speed, an engine speed and an injection quantity also can be used.

A third embodiment of the present invention will now be described. The structure of the embodiment is the same as the first embodiment shown in FIG. 1.

Figure 23:
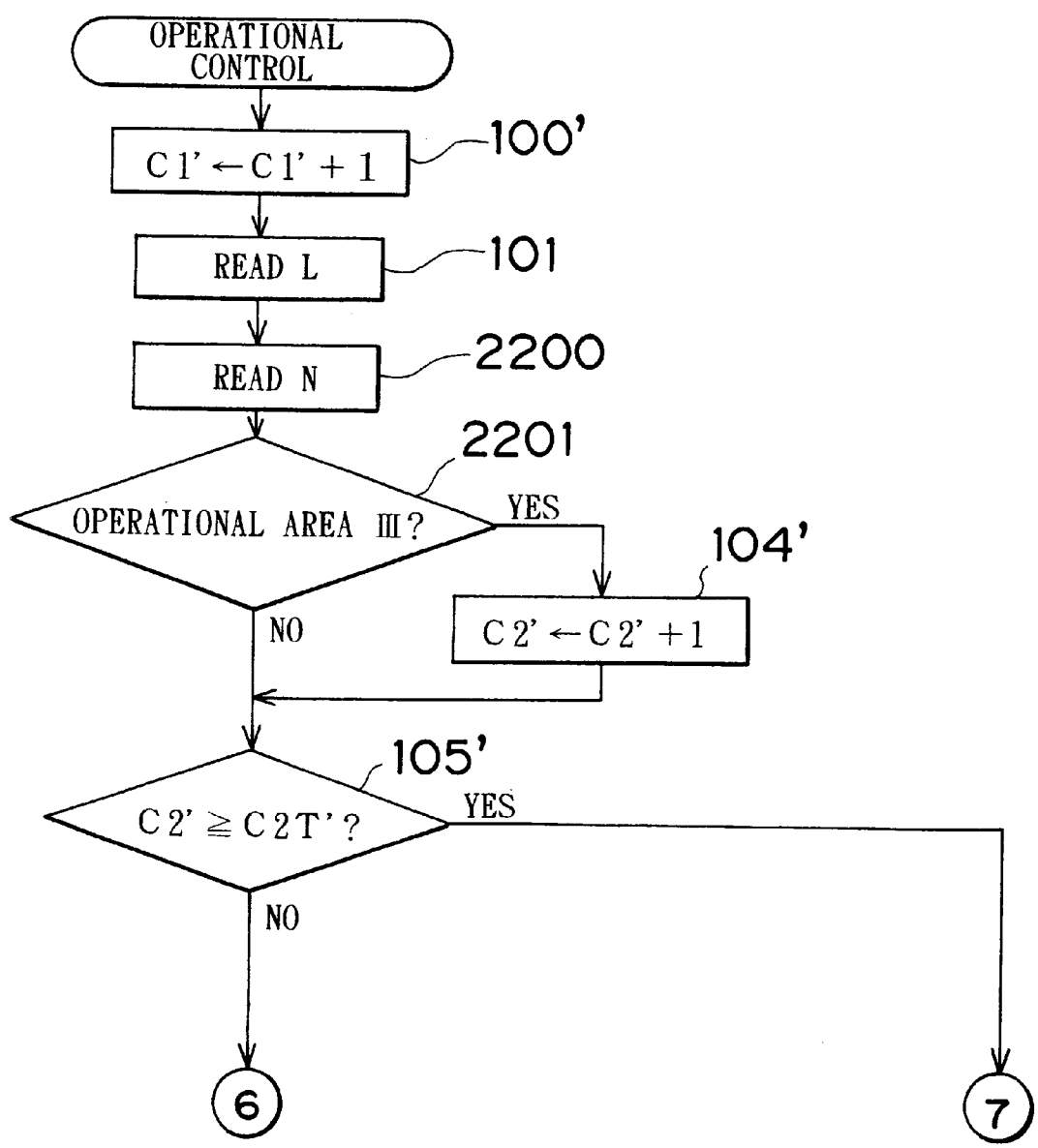
FIGS. 23, 24 and 25 are flowcharts for controlling operation of the engine according to a third embodiment of the present invention.

An explanation will be given of the operation control of the embodiment with reference to FIG. 23 to FIG. 25 focusing on processes that are different from the above embodiments.

Figure 26:
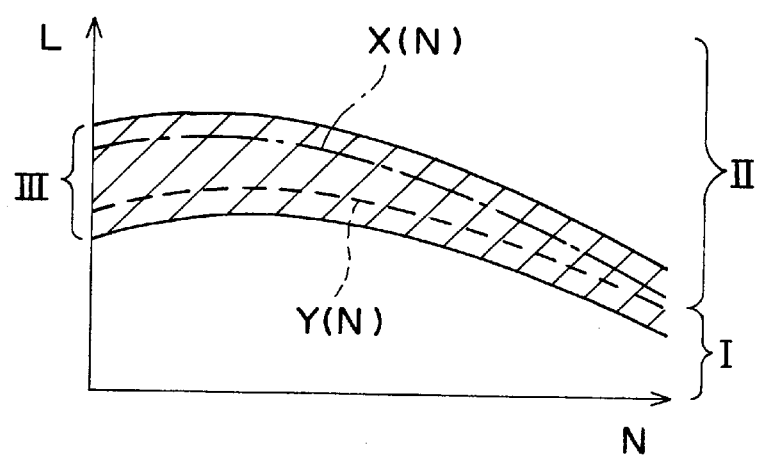
FIG. 26 shows a first operational area I, a second operational area II and a third operational area III.

In the third embodiment, at first, in step 100', a counter C1', which counts the number of readable data of load L and engine speed N is incremented (C1'←C1'+1). Next, in step 101, load L detected by load sensor 51 is read, and in step 2200, engine speed N calculated based on an output value of the crank angle sensor 52 is read. Next, in step 2201, it is determined whether or not the operational state of the engine is in the third operational area III as shown in FIG. 26, which is a boundary area between the first operational area I and the second operational area II (and which also can include portions of the first and second operational areas). If it is determined that the operational state of the engine is in the third area III, that is YES in step 2201, it is determined that the present operational state of engine is in the area where a possibility of the switching between the first combustion mode and the second combustion mode is high, and then the process goes to step 104'. On the contrary, if it is determined NO in the step 2201, the process goes to step 105'.

Next, in step 104', a counter C2', which counts the number of the frequency when the operational state of the engine is in the third operational area m is incremented (C2'←C2'+1). In step 105', it is determined whether or not C2' is equal to or larger than the predetermined threshold value C2T'. If it is determined in step 105' that C2'≧C2T'(YES), it is determined that the present operational state of the engine is in the third operational area III, and then the process goes to step 116. Namely, it is determined that the frequency of transition between the combustion modes, the first combustion mode (low-temperature combustion) and the second combustion mode (conventional combustion), is high. In step 116, the second combustion mode is performed. If it is determined that C2'<C2T'(NO), then the process goes to step 106.

Figure 24:
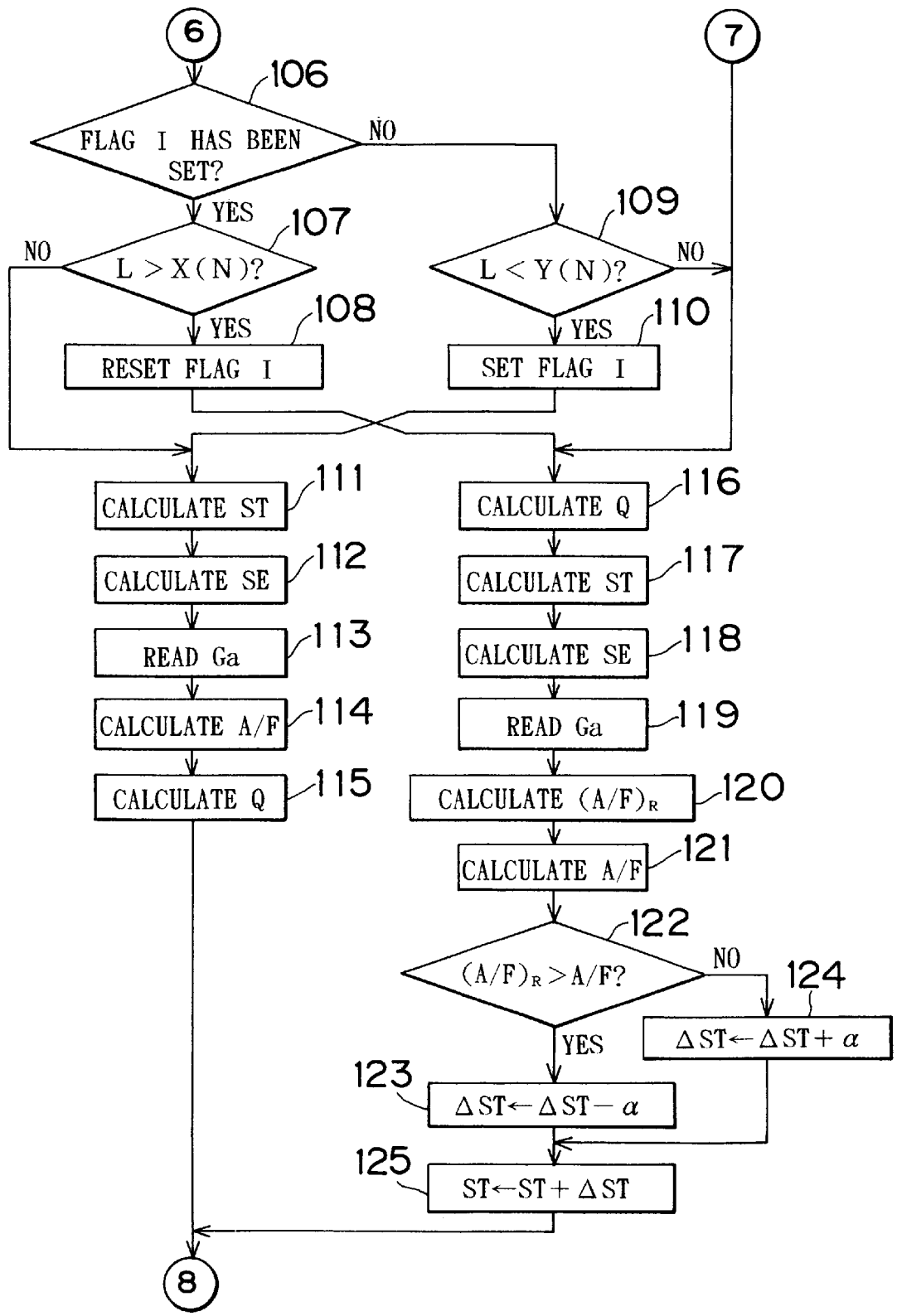

Following steps 106 through 125 shown in FIG. 24 are same as the steps shown in FIG. 16.

Figure 25:
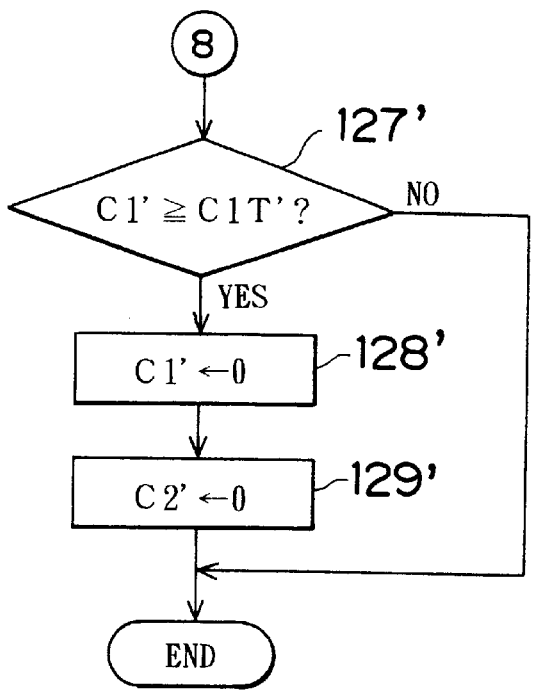

In step 127' shown in FIG. 25, the counter C1' is compared with the predetermined threshold value C1T'. When the relationship C1'<C1T' is established, that is NO in step 127', it is determined that the number of data is not enough to determine whether or not the frequency of times when the operational state of the engine is in the third operational area III, and then the routine is closed. On the contrary, when the relationship C1'≧C1T' is established, that is YES in step 127', it is determined that the decision regarding the times when the operational state of the engine is in the third operational area III has been finished, and then the counters C1' and C2' are reset in steps 128' and 129' respectively, for the next operation of the routine.

In the above mentioned third embodiment, it is determined whether or not an operational state of the engine is in the state where switching between the first combustion mode and the second combustion mode occurs often. When the operational state of the engine is in a high frequent state, that is the operational state of the engine is often in the third operational area III, the execution of the first combustion mode is prohibited. Namely, only the second combustion mode is performed when the operational state of the engine is often in the third operational area III. As a result, it is possible to reduce an undesirable situation where a generation amount of soot is increased in accordance with the transition between the first combustion mode and the second combustion mode.

A fourth embodiment of the present invention will now be described. The structure of the embodiment is the same as the first embodiment shown in FIG. 1.

Figure 27:
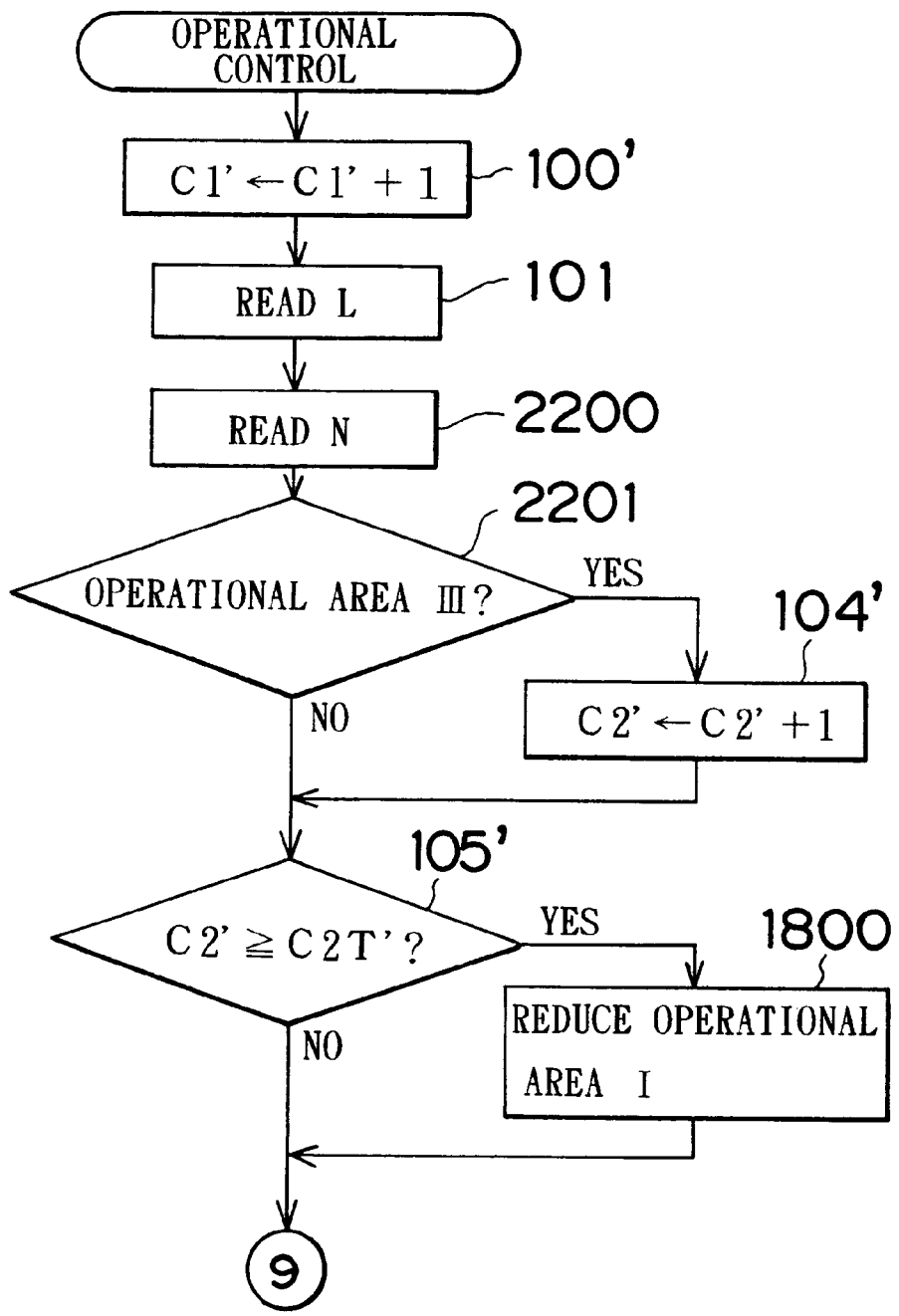
FIGS. 27, 28 and 29 are flowcharts for controlling operation of the engine according to a fourth embodiment of the present invention.

An explanation will be given of the operation control of the fourth embodiment with reference to FIG. 27 to FIG. 29 focusing on processes that are different from the third embodiment.

In the fourth embodiment, in step 105', if it is determined that C2'≧C2T'(YES), the process proceeds to step 1800. In that case, the first operational area I and the second operational area II are adjusted to be as shown in FIG. 21. As will be understood from a comparison of FIG. 7 and FIG. 21, the first operational area I is reduced in this embodiment. Therefore the first combustion mode is hardly performed. On the contrary, if NO is determined in step 105', the process proceeds to step 106 without reduction of the first operational area I.

Figure 28:
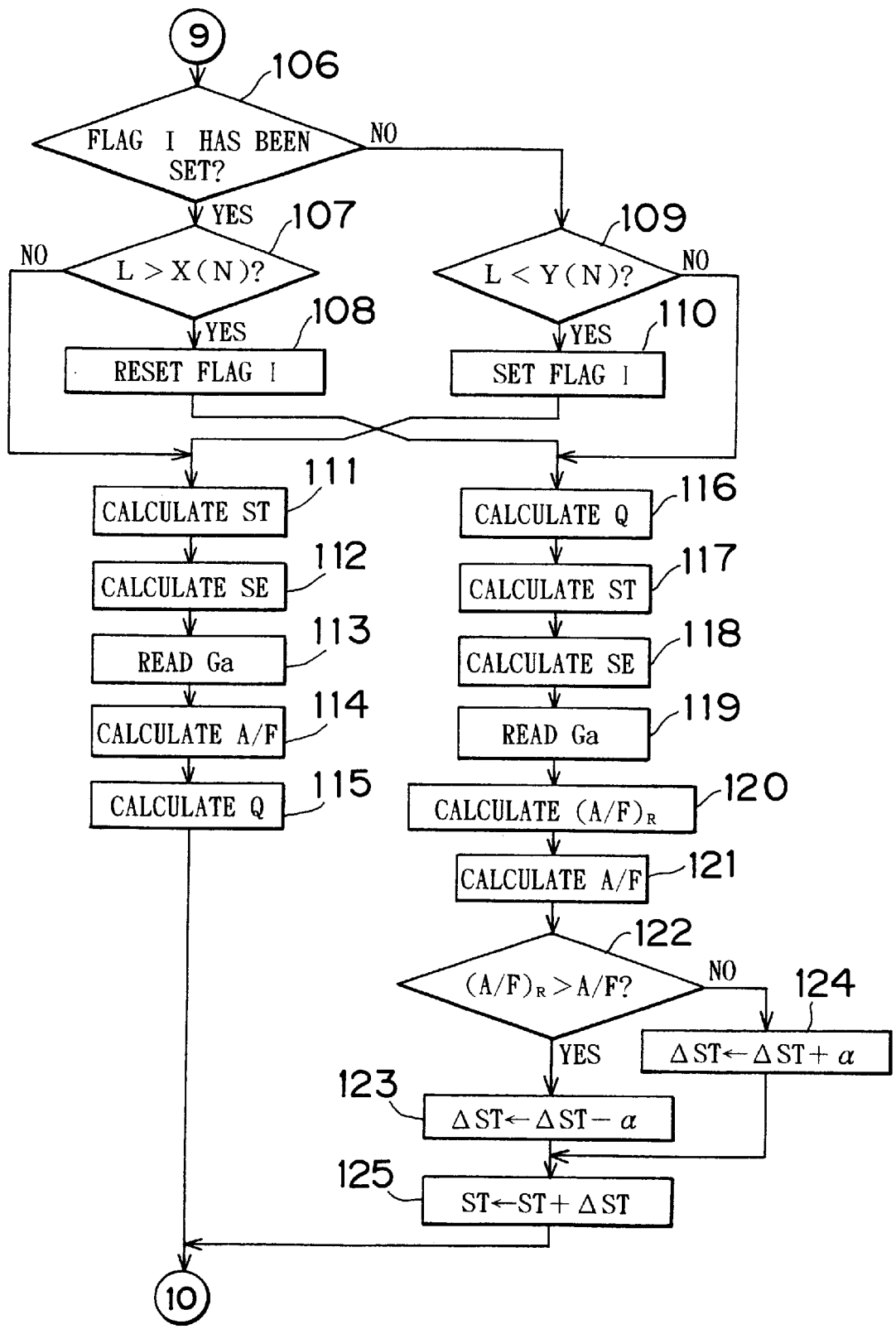
Figure 29:
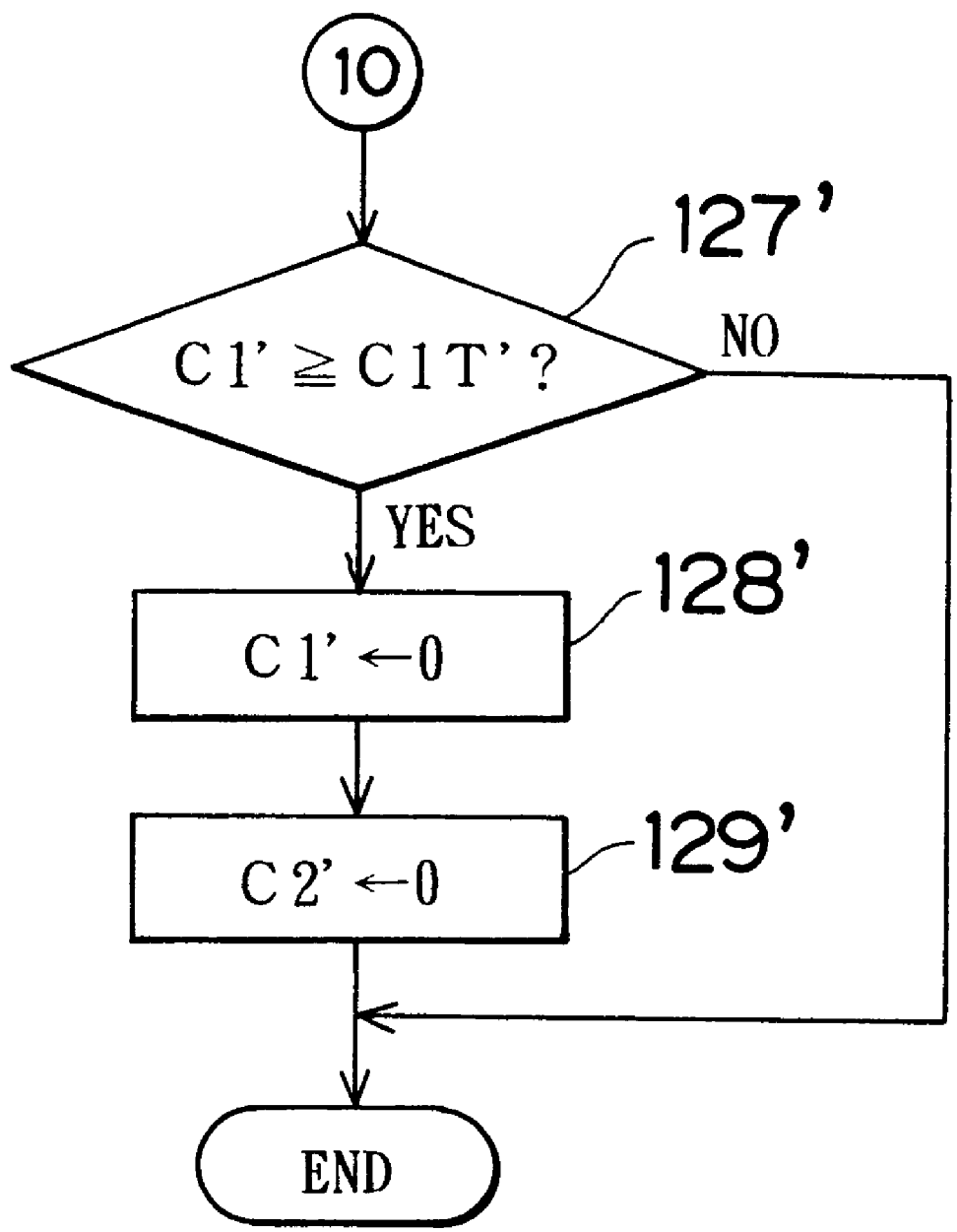

The follow steps shown in FIGS. 28 and 29 are the same as the steps shown in FIGS. 24 and 25, and therefore an explanation of these steps is omitted.

In the fourth embodiment, it is determined whether or not an operational state of the engine is in the state where switching between the first combustion mode and the second combustion mode occur often. When the operational state of the engine is in a high frequent state, that is the operational state of the engine is often in the third operational area III, the first operational area, where the first combustion mode is performed, is reduced. Namely, the first combustion mode is hardly performed, and then the number of times of switching between the first mode and the second mode is reduced. As a result, it is possible to reduce an undesirable situation where a generation amount of soot is increased in accordance with the transition between the first combustion mode and the second combustion mode.

Further, in the third and the fourth embodiments as mentioned above, the determination of the operational state of the engine, whether the state is in the third operational area III or not, is determined based on the load L and engine speed N. However, it is also possible to make this determination based on another parameter, for example an opening degree of the throttle valve or injection quantity.

A fifth embodiment of the present invention will now be described. The structure of the embodiment is the same as the first embodiment shown in FIG. 1.

An explanation will be given of the operation control of the fifth embodiment with reference to FIGS. 30 and 31.

At first, in step 2900, road information received by the navigation system 70 is read. Next, in step 2901, it is determined whether or not the vehicle is driving on a road with many of curves or a steep slope, for example. If it is determined YES in step 2901, it is determined that the present operational state of the engine is in the area where a possibility of switching between the first combustion mode and the second combustion mode is high, and then the process goes to step 116, where the second combustion mode is performed. On the contrary, if NO is determined in step 2901, the process goes to step 106.

Figure 30:
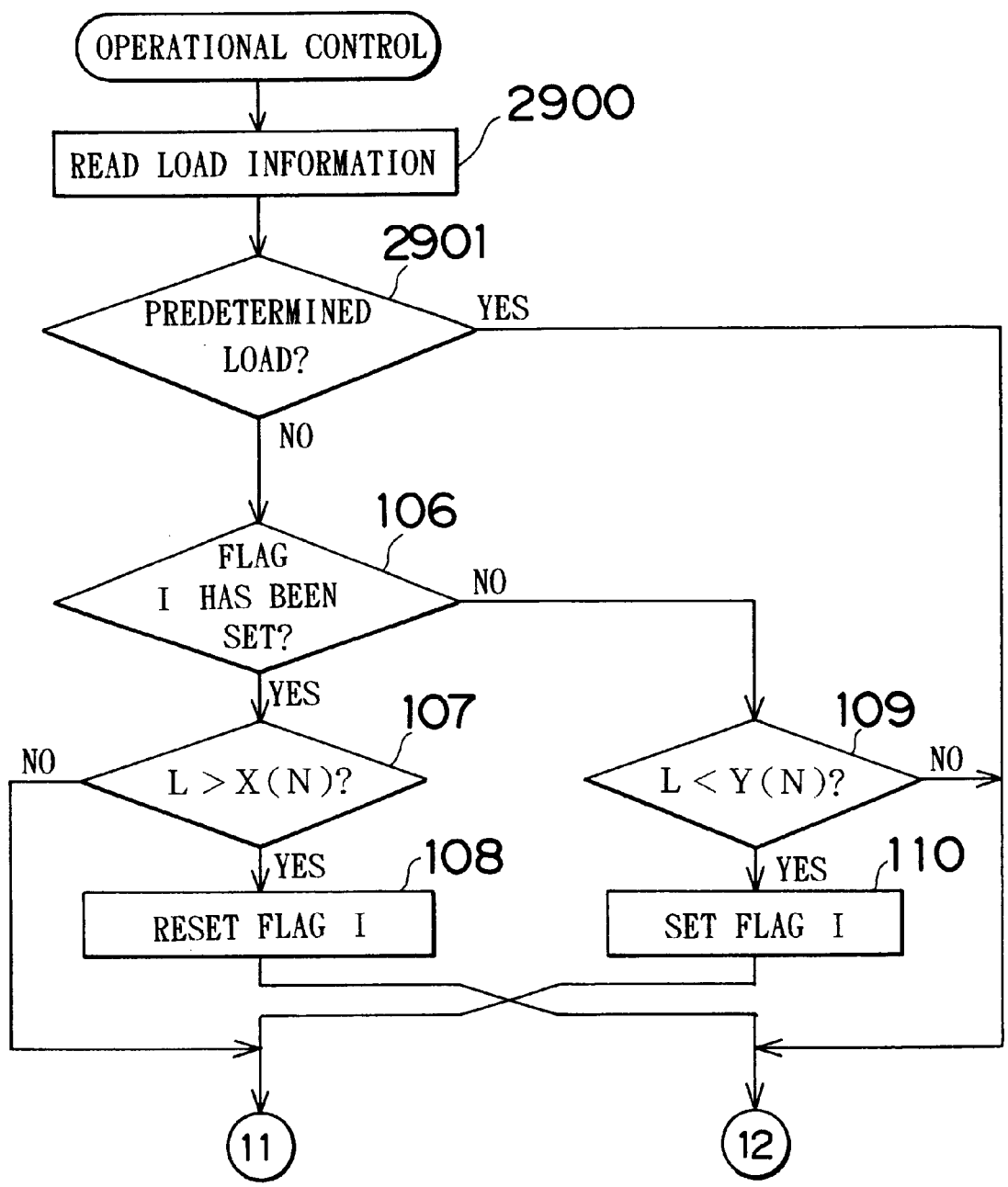
FIGS. 30 and 31 are flowcharts for controlling operation of the engine according to a fifth embodiment of the present invention.
Figure 31:
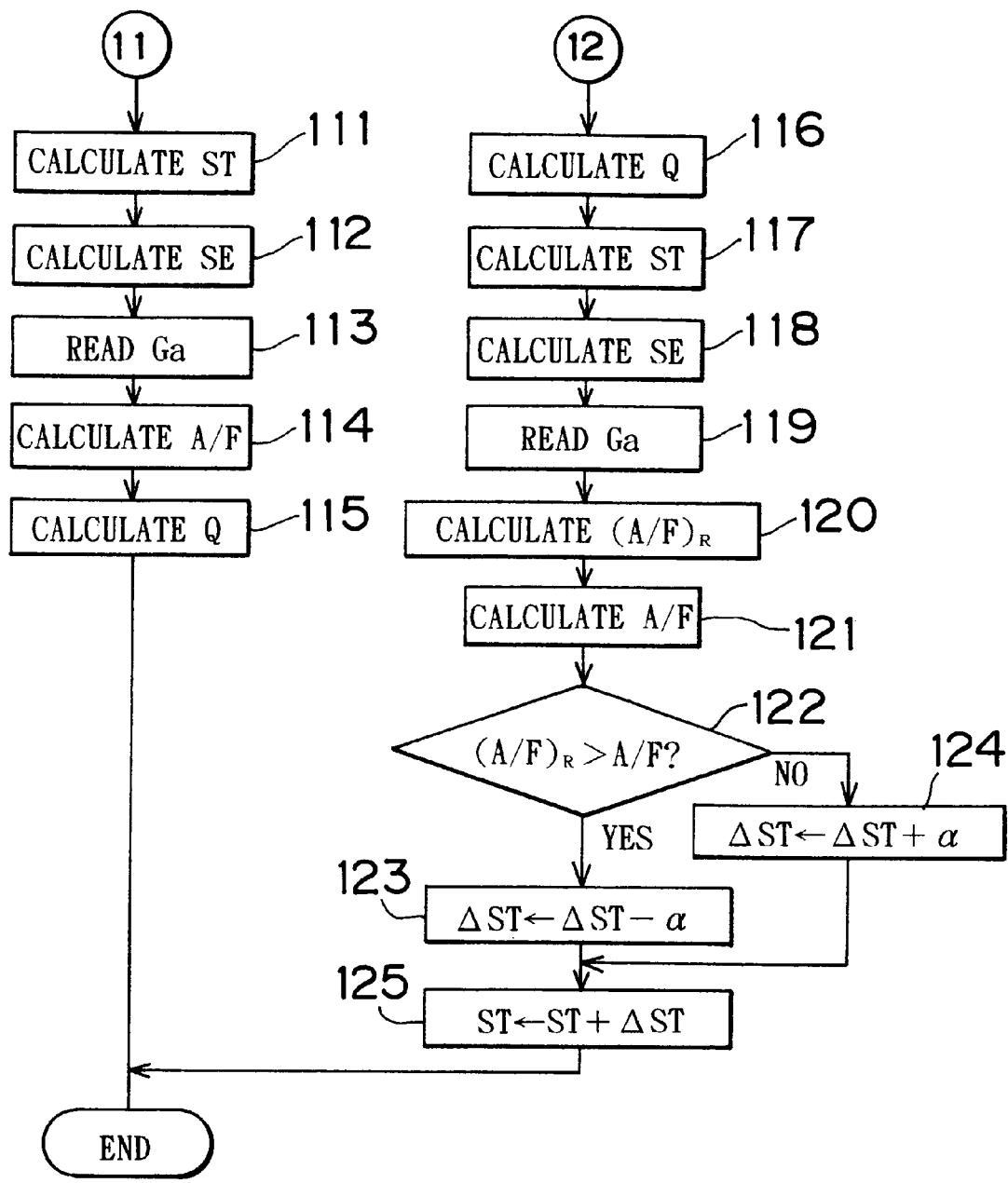

Following steps 106 to 125 shown in FIGS. 30 and 31 are the same as the steps shown in FIG. 16. However, in the embodiment, the operation control routine is closed after step 115 and step 125 Namely, the processes corresponding to the aforementioned steps 127 to 129 are not executed.

In the above mentioned fifth embodiment, when the vehicle is driven on a road with many curves or a steep slope, the execution of the first combustion mode is prohibited. Namely, only the second combustion mode is performed when the vehicle is driven on such a road. As a result, it is possible to reduce an undesirable situation where a generation amount of soot is increased in accordance with the transition between the first combustion mode and the second combustion mode.

A sixth embodiment of the present invention will now be described. The structure of the sixth embodiment is the same as the first embodiment shown in FIG. 1.

An explanation will be given of the operation control of the sixth embodiment with reference to FIGS. 32 and 33 focusing on processes that are different from the aforementioned fifth embodiment.

In the sixth embodiment, if is determined YES in step 2901, the process proceeds to step 1800. In this case, the first operational area I and the second operational area II are adjusted to be as shown in FIG. 21. As will be understood from a comparison of FIG. 7 and FIG. 21, the first operational area I is reduced in this embodiment. Therefore the first combustion mode is hardly performed. On the contrary, if NO is determined in step 2901, the process proceeds to step 106 without reduction of the first operational area I.

Figure 32:
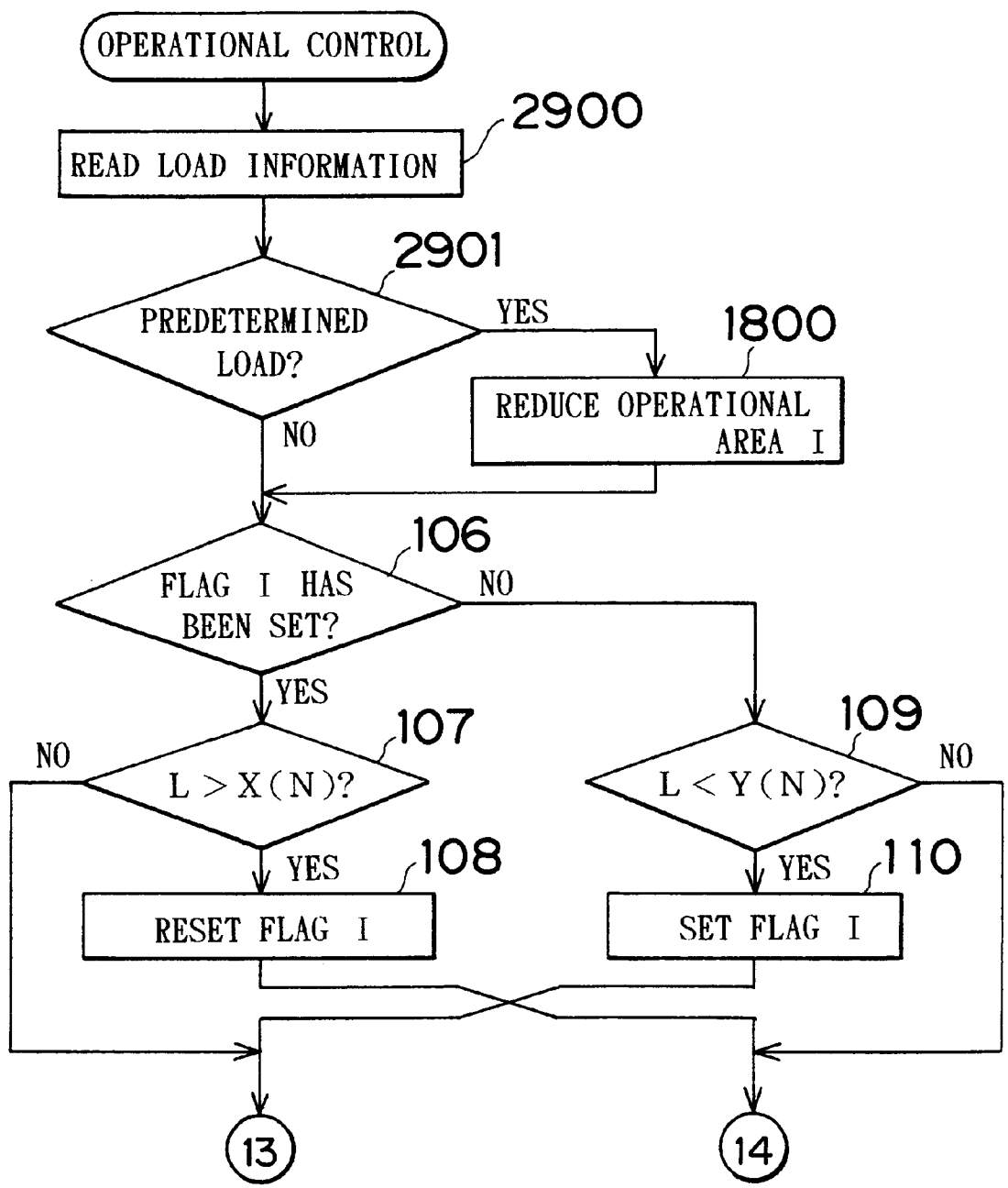
FIGS. 32 and 33 are flowcharts for controlling operation of the engine according to a sixth embodiment of the present invention.
Figure 33:
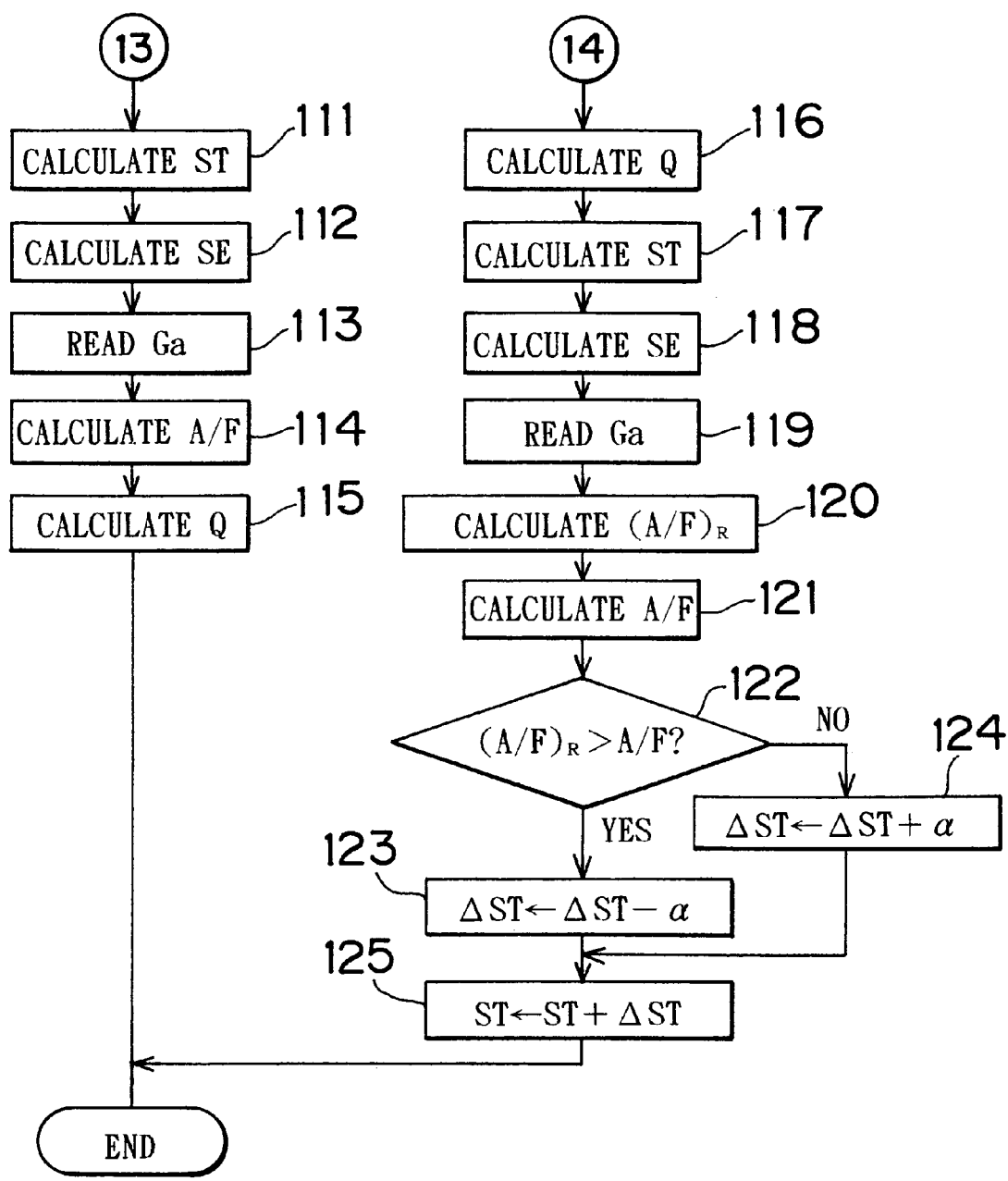

The follow steps shown in FIGS. 32 and 33 are the same as the steps shown in FIGS. 30 and 31, and therefore an explanation for these steps is omitted.

In the sixth embodiment, it is determined whether or not an operational state of the engine is in the state where switching between the first combustion mode and the second combustion mode occurs often. When the operational state of the engine is in a high frequent state, that is the vehicle is driven on a road with many curves or a steep slope, the first operational area I where the first combustion mode is performed, is reduced. Namely, the first combustion mode is hardly performed, and then the number of times of switching between the first mode and the second mode is reduced. As a result, it is possible to reduce an undesired situation where a generation amount of soot is increased in accordance with the transition between the first combustion mode and the second combustion mode.

Further, in the fifth and the sixth embodiments as mentioned above, the decision whether or not the operational state is in the state where the first combustion mode and the second combustion mode are often switched, is determined based on the road information received by the navigation system 70. However, it is also possible to determine that the vehicle is driving on a road with many curves or a steep upward slope, when a vehicle speed or engine speed goes up randomly even if an opening degree of the throttle valve or a fuel injection quantity is large.

Further, in the fifth and the sixth embodiments as mentioned above, the decision whether or not the vehicle is driving on a road with many curves or a steep slope, is determined based on the road information received by the navigation system 70. However, in the above embodiments, it is also possible to determine whether or not the operational state of the engine is in the third operational area m shown in FIG. 26, that is the boundary between the first operational area I and the second operational area II, based on the road information received by the navigation system 70.

Figure 34A:
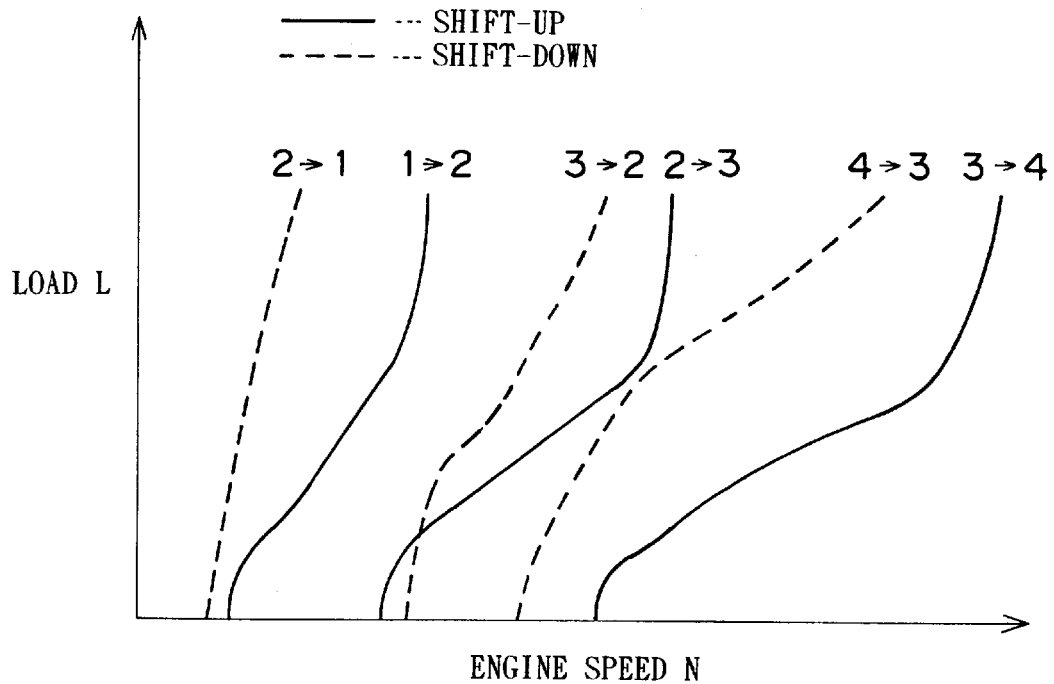
FIG. 34A is shift diagram for a first combustion mode.

Further, in each embodiment described above, it is possible to execute an additional step just before step 111, where a shift diagram for the first combustion mode as shown in FIG. 34A is selected for use with the automatic transmission 60. Similarly, just before step 116, an additional step, where a shift diagram for the second combustion mode as shown in FIG. 34B is for use with the automatic transmission 60, can be executed.

In the shift diagrams, shown in FIGS. 34A and 35B, the horizontal axis represents engine speed N and the vertical axis represents load L. However, a vehicle speed can also be replaced as the horizontal axis and an opening degree of the throttle valve can be replaced as the horizontal axis. This is possible because high vehicle speed corresponds to high engine speed, and small opening degree of the throttle valve corresponds to low load of the engine.

Figure 34B:
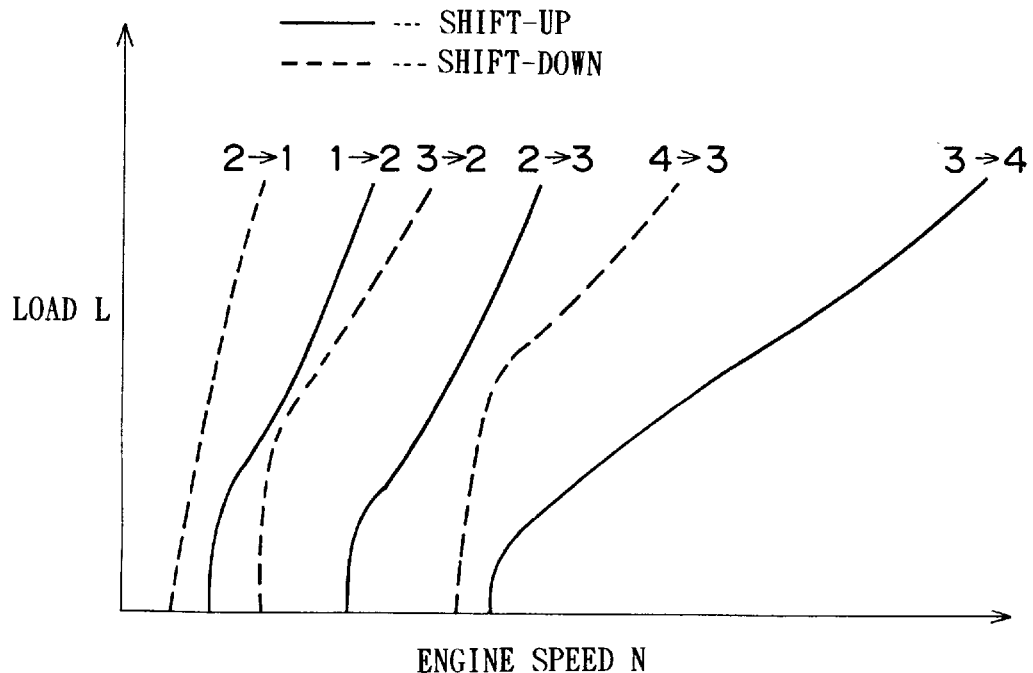
FIG. 34B is shift diagram for a second combustion mode.

As is apparent from the comparison of FIG. 34A with FIG. 34B, shift-up positions and shift-down positions shown in FIG. 34A, where the first combustion mode is performed, are shifted toward the higher speed and lower load side as compared with FIG. 34B, where the second combustion mode is performed. Therefore, when the first combustion mode (low-temperature combustion) is performed, the shift point is set so that lower gears are easily selected.

Figure 35:
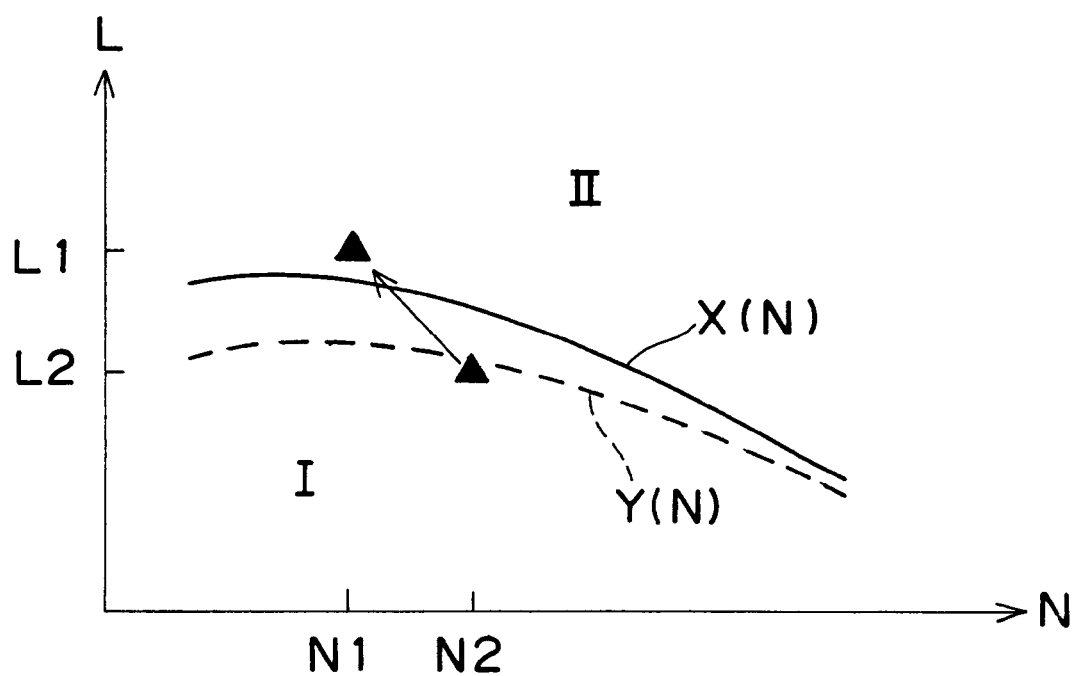
FIG. 35 shows a first operational area I and a second operational area II.

On the other hand, as shown in FIG. 7, the execution of the low temperature combustion, that is the operational state of the engine is in the first operational area I, is limited when it is possible to maintain the temperature of the fuel and the ambient gas to the value lower than the temperature at which soot is produced. Namely, when the operational state of the engine is in the first operational area I, the engine load should be relatively low and the combustion heat is relatively low. As shown in FIG. 35, when a high-speed gear is selected in the first operational area I, the engine speed will be reduced from N2 to N1 and the load of the engine will be increased from L2 to L1, if a workload is fixed. As a result, the operational state of the engine should be switched to the second operational area II. Namely, the low-temperature combustion will be performed no longer. On the contrary, in accordance with the present invention, it is possible to maintain the engine speed N2 and the load of the engine L2 because the lower-gear is easily selected intentionally. Namely, the operational state of the engine is maintain in the first operational area, thus the low-temperature combustion will be continuously performed.

As described above, when the low-temperature combustion is performed, if the shift diagram shown in FIGS. 34A and 34B is used, the shift position should be shifted to higher engine speed and lower load side as compared with when the second combustion mode is performed. Therefore, if a required workload, which is the product calculated from the engine speed and the load of the engine, when the lower-temperature combustion is performed is equal to a required workload when the second combustion mode is performed, it is possible to select a lower gear when the low-temperature combustion is performed so that the engine speed should be higher and the load of the engine should be lower as compared with the case when the second combustion mode is performed. That is, the low-temperature combustion can be performed under the condition with higher engine speed and lower load of the engine, if a workload is fixed. Namely, the area where the low-temperature combustion can be performed is substantially enlarged. As a result, it is possible to reduce an undesired situation where a generation amount of soot is increased in accordance with the transition between the first combustion mode and the second combustion mode.

In the above description, both of up-shift point and down-shift position are shifted to the high engine speed and low load side as shown in FIGS. 34A and 34B. However, it is not always necessary to shift both shift positions. Namely, it is possible to shift only either shift position depending on demand.

In the illustrated embodiment, the engine controller (electronic control unit 40) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 15–20, 23–25, 27–32 and/or 33 can be used as the controller. A distributed processing architecture can be used for maximum data/signal processing capability and speed.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An internal combustion engine system in which a generation amount of soot increases to a peak amount when increasing an amount of an inert gas supplied to a combustion chamber, the system comprising a combustion chamber and a controller that:

selectively switches operation of the engine system between a first combustion mode in which an amount of the inert gas supplied to the combustion chamber is larger than an amount of the inert gas that causes an amount of soot that is generated to become the peak amount, such that soot is hardly generated, and a second combustion mode in which an amount of the inert gas supplied to the combustion chamber is smaller than the amount of the inert gas that causes the generation amount of soot to become the peak amount; and controls the execution of the first combustion mode and the second combustion mode so that the frequency of switching between the first combustion mode and the second combustion mode is inhibited from rising above a predetermined amount.

2. An internal combustion engine system according to claim 1, wherein the controller prohibits execution of the first combustion mode in order to inhibit the frequency of switching from rising above the predetermined amount.

3. An internal combustion engine system according to claim 1, wherein the controller defines a low load side first operational area and a high load side second operational area within an operational area of the engine, and the first combustion mode is executed in the first operational area and the second combustion mode is executed in the second operational area.

4. An internal combustion engine system according to claim 3, wherein the controller reduces the first operational area in order to inhibit the frequency of switching from rising above the predetermined amount.

5. An internal combustion engine system according to claim 1, wherein the controller determines a frequency of switching between the first combustion mode and the second combustion mode, and the controller inhibits the frequency of switching from rising above the predetermined amount by reducing the frequency of switching when the determined frequency of switching is high.

6. An internal combustion engine system according to claim 5, wherein the controller prohibits execution of the first combustion mode when it is determined that the frequency of switching is high.

7. An internal combustion engine system according to claim 5, wherein the controller determines the frequency based on a load of the engine.

8. An internal combustion engine system according to claim 5, wherein the controller defines a low load side first operational area and a high load side second operational area within an operational area of the engine, and the first combustion mode is executed in the first operational area and the second combustion mode is executed in the second operational area.

9. An internal combustion engine system according to claim 8, wherein the controller determines that the frequency of switching between the first combustion mode and the second combustion mode is high when the frequency with which an operational state of the engine is located around a boundary between the first operational area and the second operational area is higher than a predetermined value.

10. An internal combustion engine system according to claim 9, wherein the controller reduces the first operational area when the controller determines that the frequency of switching between the first combustion mode and the second combustion mode is high.

11. An internal combustion engine system according to claim 8, wherein the controller reduces the first operational area when the controller determines that the frequency of switching between the first combustion mode and the second combustion mode is high.

12. An internal combustion engine system according to claim 5, further comprising a receiver that receives information about driving conditions where a vehicle having the internal combustion engine is located, and wherein the controller determines that the frequency of switching between the first combustion mode and the second combustion mode is high based on the received driving conditions.

13. An internal combustion engine system according to claim 12, wherein the driving conditions include information about the road on which the vehicle is located, and the controller determines that the frequency of switching is high when at least one of a number of curves on the road and a degree of slope of the road is greater than a predetermined value.

14. An internal combustion engine system according to claim 5, further comprising:
an automatic transmission connected with the engine; and
a transmission controller that controls a shift diagram of the automatic transmission so that shift points when the first combustion mode is performed are shifted toward a high engine speed and low load side compared with shift points when the second combustion mode is performed.

15. An internal combustion engine system according to claim 14, wherein the transmission controller selects a lower gear of the automatic transmission for a given work load, which is a product of engine speed and load of the engine, requested during the first combustion mode relative to an equal work load requested during the second combustion mode.

16. An engine controller for use with an internal combustion engine in which a generation amount of soot increases to a peak amount when increasing an amount of an inert gas supplied to a combustion chamber, wherein the engine controller:
selectively switches between a first combustion mode in which an amount of the inert gas supplied to the combustion chamber is larger than an amount of the inert gas that causes an amount of soot that is generated to become the peak amount, such that soot is hardly generated, and a second combustion mode in which an amount of the inert gas supplied to the combustion chamber is smaller than the amount of the inert gas that causes the generation amount of soot to become the peak; and
controls the execution of the first combustion mode and the second combustion mode so that the frequency of switching between the first combustion mode and the second combustion mode is inhibited from rising above a predetermined amount.

17. A method of controlling an internal combustion engine in which a generation amount of soot increases to a peak amount when increasing an amount of an inert gas supplied to a combustion chamber, the method comprising:
selectively switching between a first combustion mode in which an amount of the inert gas supplied to the combustion chamber is larger than an amount of the inert gas that causes an amount of soot that is generated to become the peak amount, such that soot is hardly generated, and a second combustion mode in which an amount of the inert gas supplied to the combustion chamber is smaller than the amount of the inert gas that causes the generation amount of soot to become the peak; and
controlling the execution of the first combustion mode and the second combustion mode so that the frequency of switching between the first combustion mode and the second combustion mode is inhibited from rising above a predetermined amount.

18. A method according to claim 17, wherein execution of the first combustion mode is prohibited in order to inhibit the frequency of switching from rising above the predetermined amount.

19. A method according to claim 17, wherein a low load side first operational area and a high load side second operational area are defined within an operational area of the engine, and the first combustion mode is executed in the first operational area and the second combustion mode is executed in the second operational area.

20. A method according to claim 19, wherein the first operational area is reduced in order to inhibit the frequency of switching from rising above the predetermined amount.

21. A method according to claim 17, further comprising: determining a frequency of switching between the first combustion mode and the second combustion mode, and wherein the frequency of switching is inhibited from rising above the predetermined amount by reducing the frequency of switching when the determined frequency of switching is high.

22. A method according to claim 21, wherein execution of the first combustion mode is prohibited when it is determined that the frequency of switching is high.

23. A method according to claim 21, wherein the frequency of switching is determined based on a load of the engine.

24. A method according to claim 21, wherein a low load side first operational area and a high load side second operational area are defined within an operational area of the engine, and the first combustion mode is executed in the first operational area and the second combustion mode is executed in the second operational area.

25. A method according to claim 24, wherein the frequency of switching between the first combustion mode and the second combustion mode is determined to be high when the frequency with which an operational state of the engine is located around a boundary between the first operational area and the second operational area is higher than a predetermined value.

26. A method according to claim 25, wherein the first operational area is reduced when it is determined that the frequency of switching between the first combustion mode and the second combustion mode is high.

27. A method according to claim 24, wherein the first operational area is reduced when it is determined that the frequency of switching between the first combustion mode and the second combustion mode is high.

28. A method according to claim 21, further comprising: receiving information about driving conditions where a vehicle having the controller is located, and wherein the determination as to whether the frequency of switching between the first combustion mode and the second combustion mode is high is based on the received driving conditions.

29. A method according to claim 28, wherein the driving conditions include information about the road on which the vehicle is located, and the frequency of switching is determined to be high when at least one of a number of curves on the road and a degree of slope of the road is greater than a predetermined value.

30. A method according to claim 21, further comprising: controlling a shift diagram of an automatic transmission connected to the engine so that shift points when the first combustion mode is performed are shifted toward a high engine speed and low load side compared with shift points when the second combustion mode is performed.

31. A method according to claim 30, wherein a lower gear of the automatic transmission is selected for a given work load, which is product of engine speed and load of the engine, requested during the first combustion mode relative to an equal work load requested during the second combustion mode.

* * * * *